United States Patent
Abonamah et al.

(10) Patent No.: US 6,550,018 B1
(45) Date of Patent: Apr. 15, 2003

(54) HYBRID MULTIPLE REDUNDANT COMPUTER SYSTEM

(75) Inventors: Abdullah A. Abonamah, Stow, OH (US); Lev Freydel, Akron, OH (US)

(73) Assignee: The University of Akron, Akron, OH (US)

( * ) Notice: Subject to any disclaimer, the term of this patent is extended or adjusted under 35 U.S.C. 154(b) by 0 days.

(21) Appl. No.: 09/506,849

(22) Filed: Feb. 18, 2000

(51) Int. Cl.$^7$ ................................................ H02H 3/05
(52) U.S. Cl. ............................. 714/6; 714/11; 714/12
(58) Field of Search .......................... 714/6, 11, 12, 714/13, 10, 55

(56) References Cited

U.S. PATENT DOCUMENTS

| | | | | |
|---|---|---|---|---|
| 3,681,578 A | * | 8/1972 | Stevens | 714/11 |
| 4,583,224 A | * | 4/1986 | Ishii et al. | 714/10 |
| 4,616,312 A | * | 10/1986 | Uebel | 714/11 |
| 4,622,667 A | | 11/1986 | Yount | 371/9 |
| 4,726,026 A | | 2/1988 | Hilford et al. | 371/25 |
| 4,868,826 A | | 9/1989 | Smith et al. | 371/9.1 |
| 5,084,878 A | | 1/1992 | Kanekawa et al. | 371/36 |
| 5,271,023 A | | 12/1993 | Norman | 371/68.3 |
| 5,339,404 A | | 8/1994 | Vandling, III | 395/575 |
| 5,349,654 A | * | 9/1994 | Bond et al. | 714/45 |
| 5,423,024 A | * | 6/1995 | Cheung | 714/11 |
| 5,452,441 A | * | 9/1995 | Esposito et al. | 714/13 |
| 5,530,946 A | | 6/1996 | Bouvier et al. | 395/182.21 |
| 5,537,583 A | | 7/1996 | Truong | 395/550 |

(List continued on next page.)

OTHER PUBLICATIONS

Frederickson, A.A., *Fault Tolerant Programmable Controllers For Safety Systems*, ISA Transactions, vol. 29 (1990), pp. 13–17.

Goble, W.M., *Control Systems Safety Evaluation And Reliability*, ISA (1998), pp. 364–375.

Pradhan, D.K., *Fault–Tolerant Computer System Design*, Prentice PTR (1996), pp. 9–11, 19–21, and 63–65.

(List continued on next page.)

*Primary Examiner*—Robert Beausoliel
*Assistant Examiner*—Yolanda L. Wilson
(74) *Attorney, Agent, or Firm*—Renner, Kenner, Greive, Bobak, Taylor & Weber

(57) ABSTRACT

A hybrid multiple redundant computer system (10) having at least three parallel operating processing units (12) including input module (14), central processor module (16), and output module (50) in each processing unit is disclosed. The central processor module (16) is connected to the associated input module (14) and connected to primary and secondary output circuits (18, 20) located in the associated output module (50) and in the neighboring output module (50) respectively. Each processing unit (12) further includes a watchdog controller (30) that monitors the associated central processor module (16) and transfers an alarm signal (44) to each output module (50) in the event that a central processor module (16) fails. Primary and secondary output circuits (18, 20) in each output module (50) control an output voter network (22) and perform selectable but different logical functions among output data of the respective central processor modules (16) and alarm signals (44) for providing no single point of failure within the output module (50). If alarm signals (44) are not activated, the system generates an output (180) using two-of-three vote among output data produced by three central processor modules (16). In the event that one or two central processor modules (16) fail, the system is reconfigured to a two-of-two and to a one-of-one vote configuration respectively. Each central processor module (16) in turn monitors the status of all of the system components and disables faulty outputs by opening a fault recovery switch (54) in the respective output module (50) allowing continued system operation in the face of as many as two faults within any system components.

13 Claims, 11 Drawing Sheets

U.S. PATENT DOCUMENTS

| | | | | |
|---|---|---|---|---|
| 5,550,736 | A | | 8/1996 | Hay et al. ............... 364/424.03 |
| 5,613,064 | A | | 3/1997 | Curtin ................... 395/184.01 |
| 5,630,053 | A | | 5/1997 | Morikawa .............. 395/184.01 |
| 5,862,315 | A | | 1/1999 | Glaser et al. .......... 395/182.09 |
| 5,907,671 | A | * | 5/1999 | Chen et al. ..................... 714/6 |
| 6,141,769 | A | * | 10/2000 | Petivan et al. ................ 714/10 |
| 6,141,770 | A | * | 10/2000 | Fuchs et al. .................. 714/11 |

OTHER PUBLICATIONS

Freydel et al., *A Cost Effective Hybrid Redundancy Scheme For Fault Tolerance And Reliability Of Control Systems*, Proceedings of JCIC, vol. 4 (1998), pp. 142–146.

Beckman, L., *Safety Performance vs. Cost Analysis Of Redundant Architectures Used In Safety Systems*, Advances in Instrumentation and Control, ISA/96 Conference, ISA, vol. 50, Part 1 (1996), pp. 372–375.

Bukowski, I.V. and Goble, W.M., *Comparing Control Systems' Reliability: Architecture, Diagnostics, and Common Cause*, Proceedings of ISA/94 Conference and Exhibit ISA (1994).

Goble, W.M., *Safety of Programmable Electronic Systems: Critical Issues, Diagnostics, and Common Cause*, Proceedings of the Fourth Conference on Advances in Process Control, York, UK (1995), pp. 3–7.

ISA—84.01—1996, Standard: *Application Of Safety Instrumented Systems For The Process Industries*, pp. 15–25, 70–72 (1996).

\* cited by examiner

HYBRID MULTIPLE REDUNDANT COMPUTER SYSTEM

TECHNICAL FIELD

The present invention relates generally to computer systems devoted for safety-critical and critical-control applications. More particularly, the present invention relates to hybrid multiple redundant systems that combine majority voting with fault diagnostic and fault recovering means to provide correct outputs of a system in the presence of multiple system component faults.

BACKGROUND OF THE INVENTION

The evolution of the computer has opened the door to widespread automation. Increasingly, computer systems handle critical tasks, such as, industrial control of oil, gas, nuclear, and chemical operations, patient monitoring, aircraft flight control, and military systems among others. Within these systems, emergency shutdown systems are used in safety-critical applications to monitor processes and remove the process to a safe state when selected process variables fall outside of a safe range. As one example, in an oil refinery, the pressure of an air compressor unit expander and its temperature are monitored and shutdown actions are taken if these reach an upset condition. In this example, the emergency shutdown system is designed to protect the process separately from the basic process control system. Critical control systems, on the other hand, provide both continuous control and protection for many safety-critical applications like gas and steam turbines, boilers, and offshore platforms. In a gas or steam turbine, for example, the critical control system provides non-stop speed control as well as start-up and shutdown sequencing in a single integrated system. In all of the above examples, and other related industries, improved technologies add complexity and increase production output, making reliance on emergency shutdown systems and critical control systems increasingly important. Computer systems devoted for safe and critical control applications must have extremely high degrees of safety and reliability since faults in computer systems can cause vast economic loses and endangers human beings. A system failure that occurs as a result of a system component fault can be either safe or dangerous. A safe failure occurs when a system has failed into a safe state, or in other words, where the system does not disrupt the operation of other systems or compromise the safety of personnel associated with the system. The safe failure occurs, for example, when an emergency shutdown system (ESD) fails in such a way that it causes a shutdown not associated with the controlled process. A dangerous failure is a failure that prevents the system from responding to hazardous situations, allowing hazards to develop. For instance, a dangerous failure occurs when the ESD cannot perform a required shutdown.

Redundant configuration of computing systems have been used in several research and designs to provide system fault tolerance, which is concerned with the continuation of correct operation of a system despite occurrence of internal faults. The spectrum of fault tolerance techniques can be divided into three major classes: static redundancy, dynamic redundancy, and hybrid redundancy.

Static redundancy provides fault tolerance without performing fault detection and recovery. One method of fault masking is through a voting process. Triple Modular Redundant (TMR) systems are the most common form of voting based systems. The conventional TMR system includes three identical controllers along with an output voter network that votes the outputs of the three controllers. See, e.g., Frederickson A. A., "A Hybrid multiple redundant Programmable Controllers for Safety Systems", @ ISA Transactions, Vol. 29, No. 2 (1990) pp. 13–17. Each controller usually includes an input module, a main processor module, and an output module. By using three identical controllers in combination with the voter network, any single computer fault is masked by the 2-of-3 voting, so any single fault does not lead to the system failure.

In many cases, however, two concurrent faults lead to a system failure. For example, if the TMR system is used as an Emergency Shutdown system, its outputs will be in ON condition under normal operation and in an OFF state for a shutdown. If, for example, two output modules of the TMR fail at the same time, in such a way that their outputs remain in an OFF condition, then the system fails safely, making a false shutdown. On the other hand, when two output modules fail in such a way that their outputs remain in an ON state, it can lead to a dangerous system failure. This failure is termed dangerous because, despite a process problem, the process cannot shut down.

To compensate for the TMRs inability to tolerate more than one controller failure, quick fault detection must be used to minimize the period of time that the system operates in a vulnerable condition. Commercial versions of TMR offer online module replacement and repair capability to address this problem. However, if one controller of the TMR fails and it has not been replaced, a fault in another controller can lead to a system safe or dangerous failure. Thus, the success of online repair depends on the user ability to discover and diagnose the problem in a short time period. Since fault discovery and repair rate are limited by many reasons, even a single controller failure may bring the system to a vulnerable mode.

As an alternative method of compensating for this vulnerability, known devices employ an output hot spare in an attempt to overcome the problem. That system has two triplicate I/O modules in parallel, where one module, a primary, is active, while the other module—a hot spare is powered but inactive. Each output module usually includes three identical legs located in a single board. Under normal operation, hot spare module outputs are OFF so they do not affect the system output. If a fault is detected on the primary module, the control is automatically switched to the hot spare module, allowing the system to maintain 2-of-3 voting continuously. The faulty module can then be removed and replaced without process interruption.

The hot spare method reduces the probability of a safe failure within a TMR system. For example, when a safe failure occurs in any leg of primary output module that is discovered and the hot spare outputs are passed to the ON state allowing the system to maintain energized condition of system outputs. However, employing a hot spare adds to the number of components in the system increasing the overall system cost. As a further disadvantage, the hot spare is useless when the outputs of faulty modules remain in an ON state, and, thus, cannot prevent the occurrence of a dangerous system failure.

To tolerate additional concurrent faults, known devices can add replicate computers within the voting scheme. For example, a five modular redundant system (5MR) would perform three-out-of-five voting in order to tolerate two faults. Unfortunately, the 5MR system requires large additional resources, which significantly increases size and weight of the system, making it very expensive to implement.

Turning away from static redundancy methods, Dynamic redundancy methods achieve fault tolerance by detecting the existence of faults and performing system reconfiguration to prevent a system failure. Dynamic redundancy systems have built-in fault detection capability. When a fault is detected, the system is usually reconfigured by activating a spare processor or computer. The most common example is the use of dual computer system that includes primary and spare computers operating in parallel. The system also includes a central diagnostic module that monitors primary computer and switch-over system output to the spare computer when the primary computer fails. The Dual Dynamic Redundancy (DDR) system has, therefore, three independent components: two computers and the Central Diagnostic Module (CDM) and it tolerates any single component failure. The DDR system, however, cannot operate properly in the presence of two concurrent faults. If two computers of the DDR fail at the same time, the entire system will fail too.

An alternative approach of the dynamic redundancy is used in industrial control systems (2oo2D system) such as described in the book Goble, W. M. "Control Systems Safety Evaluation & Reliability", @ ISA (1998) pp. 364–375. The 2oo2D system contains two programmable controllers operating in parallel. Each controller has an independent diagnostic module that opens a special output switch, de-energizing controller outputs in the event that the controller fails. Possible dangerous failure(s), therefore, are converted into safe failure(s). In the event that one controller fails in such a way that its outputs remain de-energized, the system will still operate via a second controller avoiding a false shutdown.

However, fault tolerance and reliability of the 2oo2D system depends in great part on the fault coverage, which is defined as the probability that a failure will be detected/recovered if it occurs. In contrast to the voting based system, the 2oo2D system has no property of fault masking so in the event that undetectable fault occurs the system can fail too. As well as the TMR, the 2oo2D system can tolerate only one component failure.

Another dynamic technique, disclosed in the U.S. Pat. No. 5,956,474, utilizes triple modular pairs (FIG. 8), each of which includes a computer element connected to an input/output (I/O) controller for providing system fault resilient and fault tolerance. The I/O controller in each pair periodically synchronizes and monitors operation of computing elements by software comparing their output data and checksums and disables a faulty computing element if its fault is discovered. Although this approach, for some kind of computing failures, providing normal system operation when all but one computing elements fails, the I/O controller is not fault tolerant. Consequently, it may produce false outputs if two I/O controllers simultaneously fail. Therefore, this system can tolerate only a single component failure.

Recognizing the shortcomings of static and dynamic systems, Hybrid redundant systems or HTMR systems combine the attractive features of both static and dynamic approaches. Fault masking is used to prevent the system from producing erroneous outputs, and fault detection and system reconfiguration are used in case of a fault. A conventional hybrid reconfiguration includes a triple module redundant system with an output voting circuit and a plurality of stand-by computers. The system further includes fault detecting and switching circuits that locate the faulty computer among the active computers and isolate the faulty computer from the triple module redundant system. In this way, the faulty computer is substituted by one of the stand-by computers. See E. G., Pradhan, D. K., "Fault-Tolerant Computer System Design," Prentice Hall PTR 1996, pp. 19–21. Since conventional hybrid configuration requires large addition modules, it makes it very expensive to implement. Another drawback of the conventional hybrid system is that it is not possible to avoid additional faults within the fault detecting, switching, or voting circuits.

Another hybrid redundant system disclosed in the U.S. Pat. No. 5,084,878, utilizes multiple computer subsystems each of which includes self-diagnostic and cross-diagnostic means at the processor level. Results of the diagnostic means, together with outputs of the subsystems, are connected to a switch matrix that selects the correct output of each subsystem and passes these outputs to a majority voter. This system provides fault tolerance with respect to detectable subsystem faults and, as a result of its diagnostic means, it is able to operate normally even with all but one subsystem is still healthy. Unfortunately, this system is still susceptible to a fault occurring in the switch matrix or majority voter. In particular, the system uses a common output selecting circuit consisting of a switch matrix and the output voter. Thus, it may fail when either the switch matrix or majority voter fails. The system reliability, therefore, is greatly dependent on the switch matrix and voter reliability. Moreover, use of the switch matrix limits the practical number of inputs that this system is capable of receiving. To implement the system for critical control applications, such as industrial control or emergency shutdown systems, the system should operate with many hundred, if not thousands, of inputs and outputs. To accommodate these outputs, the switch matrix and output voter complexity grows rapidly. Consequently, the reliability of each of these components eventually dominates the reliability of the system.

In many critical-control and critical-computation applications, at least two faults must be tolerated to provide the required reliability. Therefore, there is a need for a hybrid multiple redundant computer system that remains operational in the presence of two concurrent faults occurred in any system components.

SUMMARY OF THE INVENTION

An object of the present invention is, therefore, to provide a hybrid multiple redundant computer system, which comprises at least three redundant processing units that combine majority voting with fault diagnostics and fault recovery means configured such that any two concurrent faults occurred in any two system components will not lead to a system failure.

It is another object of the present invention to provide a hybrid multiple redundant computer system comprising three redundant processing units that is able to operate normally in the presence of multiple component faults and remain operational if at least one processing unit is still healthy.

It is another object of the invention to provide a hybrid multiple redundant system comprising three redundant processing units that is able fail safely in the event that three processing units concurrently fail.

It is another object of the invention to provide a hybrid multiple redundant system comprising three redundant processing units that is modified from 2-of-3 voting configuration to the 2-of-2 configuration in the presence of one central processor module (CPM) fault and to the 1-of-1 configuration in the presence of two CPM faults.

It is another object of the invention to provide a hybrid multiple redundant system comprising three redundant processing units that is able fail safely in the event that three central processor modules concurrently fail.

It is another object of the invention to provide a hybrid multiple redundant system comprising three processing units that remains operational in the event that two out of three input modules concurrently fail.

It is another object of the invention to provide a hybrid multiple redundant system comprising three processing units that remains operational in the event that two out of three output modules concurrently fail.

It is another object of the invention to provide a hybrid multiple redundant system comprising three processing units that is able fail safely in the event that three output modules concurrently fail.

The present invention generally provides a redundant hybrid multiple redundant computer system having three data processing units, operating in parallel, that combine majority voting with fault diagnostic and fault recovery means configured such that any two concurrent faults occurring in any two system components will not lead to a system failure. Briefly, and in general terms, the invention comprises first, second, and third processing units operating in parallel, each of which includes a central processor module connected to an input and an output module. The central processor module receives input data from the associated input module and uses this data as input to a control program that provides output data for two output modules in such a manner that the central processor module associated with the first processing unit transmits output data to the associated output module and to the output module associated with the second processing unit, and the central processor module associated with the second processing unit transmits output data to the associated output module and to the output module associated with the third processing unit, the central processor module associated with the third processing unit transmits output data to the associated output module and to the output module associated with the first processing unit.

Input modules of the system are connected in parallel and each input module receives the same input data from multiple field sensors and other devices providing system inputs. Output modules of the system operate in parallel with each other providing system outputs that correspond to the system inputs. The system of the invention also includes watchdog controller in each processing unit for detecting the occurrence a fault within the central processor module and transferring an alarm signal to each output module in the event that this central processor module fails.

The output module, having no single point of failure, produces its output as a logical product of output data received from the associated central processor module and from the other central processor modules in the absence of an alarm signal in each processing unit. It disables its output if an alarm signal is received from the associated watchdog controller. The output module generates output is using only the output data received from the associated central processor module if at least one out of two alarm signals produced by the neighbor watchdog controllers is activated. The output module in the first processing unit, for example, produces its output as a logical product of output data received from the first central processor module and from the central processor module associated with the third processing unit if alarm signal in each processing unit is not activated, it only uses output data of the first central processor module if at least one out of two alarm signals produced by watchdog controllers associated with second and third processing unit is activated, and it disables its output if alarm signal received from the watchdog controller associated with the first processing unit is activated.

In normal system operation, when alarm signals are not active, each output module produces its output as a logical product of output data received from two central processor modules. The system output is formed as the sum of logical products AC, AB, and BC, where A, B, and C are output data generated by central processor module associated with first, second, and third processing units, respectively. In normal operation, the system, therefore, performs a two-out-of-three vote among output data produced by the three central processor modules. This two-out-of-three voting increases system fault tolerance by masking transient faults that may be left undetected. This allows the system to produce correct outputs despite an undetected failure caused by a central processor module fault.

In the event that a central processor module fails and its fault is discovered, the associated watchdog controller activates the alarm signal that disables outputs of the associated output module. This alarm signal also instructs each of the other output modules to generate output corresponding only to output data produced by its associated central processor module. In the presence of one faulty central processor module, it allows the system to reconfigure from the triple module configuration to the two-out-of-three (2oo2D) dual redundant configuration. In the presence of two faulty central processor modules, outputs of both associated output modules are disabled, and the system still operates with one healthy central processor module. The system, therefore, still operates properly in the presence of faults in any two central processor modules. Further, the system provides means for setting all system outputs to a predetermined safe condition in the event when each central processor module fails.

Each output module of the invention also provides fault tolerance capability that allows the system to generate correct outputs in the presence of up to two faults within the output module. The output module in each processing unit comprises a primary output circuit, a secondary output circuit and an output voter network. In each output module, primary and secondary output circuits receive output data from the associated central processor module and from certain other central processor module respectively. The output voter network is connected to outputs of the associated primary and secondary output circuit for producing a logical product of these outputs on the output of this output module. Hence, the output voter network generates this output as a logical product of output data received from two corresponding central processor modules. Outputs of three output voter networks are connected together for providing two-out-of-three voting among output data of three central processor modules.

In each output module, the primary output circuit is further connected to the associated watchdog controller for receiving an alarm signal only from this watchdog controller. In contrast, the secondary output circuit in the same output module is connected to the two other watchdog controllers and receives alarm signals from both of them. Primary and secondary output circuits perform selectable but different logical functions with output data received from the corresponding central processor modules and alarm signals.

The output voter network comprises multiple parallel operating pairs of first and second electronic valves connected in series, such that each pair is connected on one side to an external power supply and on the other side to the output of the associated output module. In normal operation, the primary output circuit in each output module controls first electronic valves, while the second output circuit in the same output module controls second electronic valves. The primary output circuit sets each first electronic valve ON or OFF in accordance with output data of the associated central processor module if an alarm signal produced by the associated watchdog controller is not activated. In the event that the associated central processor module fails and its associated alarm signal is activated, the primary output circuit disables all outputs of the associated output voter network by setting all first electronic valves OFF. At the same time, the secondary output circuit in each other output module also receives the alarm signal produced by the watchdog controller associated with the faulty central processor module. The secondary output circuit sets each second electronic valve ON or OFF in accordance with output data received from the corresponding central processor module if no alarm signals are activated. In the event that any alarm signal is activated, the secondary output circuit transfers control over the output voter network to the primary output circuit in the same output module. Hence, if one central processor module fails, each output module that is not associated with the faulty central processor module will produce output by only using output data received from its associated central processor module. In the presence of one faulty central processor module, the system, therefore, is reconfigured from the triple modular configuration to the two-out-of-two (2oo2D) dual redundant configuration.

Each output module further includes a fault recovery valve connected by one side to the external power supply and connected by other side to each pair of the electronic valves in a point where these pairs are connected together. The fault recovery valve is driven by the associated watchdog controller for disabling all outputs of the associated output module in the event that either associated primary output circuit and/or output voter network fails. Three central processor modules periodically communicate to each other for on-line testing of primary output circuits, secondary output circuits, and output voter networks at the same time. Each central processor module has means for reading the status of the associated primary output circuit and the secondary output circuit in the same output module. In the event that either the primary output circuit or both primary and secondary output circuits in the same output module fail, the associated central processor module commands the associated watchdog controller to set the associated fault recovery valve OFF via the alarm signal disabling each output of the associated output module from the system outputs. In that case, the system will operate with two healthy output modules, again changing to the 2oo2D dual redundant configuration. In the event that two primary output circuits fail concurrently, the associated output modules are disabled via the associated fault recovery valves, but the system continues to operate with one healthy output module. In general, the system remains operational in the presence of any two faulty primary or secondary output circuits, as well as in the presence of concurrent faults in any pair of primary and secondary output circuits. In the event that each primary or each secondary circuit fails, the system provides fail-safe outputs because all fault recovery valves will be OFF.

All electronic valves in the output voter network are tested periodically by checking the ability of each valve to pass from ON to OFF and back according to the output data of the central processor module. Each output voter network further includes a current sensor in each pair of first and second electronic valves to monitor valve status. This current sensor is connected in series with the first and the second electronic valves and it is connected to the primary output circuit producing feedback data to inform the associated central processor module about current flowing through each pair of valves. Each central processor module reads the feedback data from the associated primary output circuit and compares these feedback data with the recent output data. If two electronic valves in the different output modules concurrently fail open, the corresponding outputs in these faulty output modules will be disabled, but the system will still operate properly with one healthy output module. In the event that any two electronic valves in series fails short, the respective central processor module will command the associated watchdog controller for activating alarm signal to set the associated fault recovery valve OFF for disabling each output of the associated output module from the system outputs. In that case, the system will operate with two healthy output modules, modifying to the 2oo2D dual redundant configuration. Therefore, the presence of any two faulty electronic valves will not lead to the system failure. Generally, the system is able to remain operational in the presence of any two component faults until these faults are detected.

The present invention further provides a system, as described above, where each processing unit further includes an OR-gate, the first input of which is connected to an additional output of the associated central processor module. The second input of the OR-gate is connected to the output of the associated watchdog controller. This embodiment allows the alarm signal on the output of the OR-gate to be activated if either the associated watchdog controller or the associated central processor module produces an alarm signal. The central processor module in this embodiment can produce an alarm signal upon detecting a fault within the associated output module. Further, the central processor module may produce an alarm signal when the associated watchdog controller fails.

Higher levels of the system fault tolerance substantially decreases the probability of both safe and dangerous system failures helping to prevent lost production due to false shutdown and providing much higher protection of personnel and equipment. Since many of the applications involve processes that are very expensive to shut down and start up, the computer systems, based upon the invention architecture, will provide a great economical benefit. More importantly, the emergency shutdown systems, based on the invention, reduce the likelihood of disabling injuries in critical industrial applications, such as in chemical and oil-refinery industries.

It will be appreciated that other objects and advantages of the present invention will become apparent from the following description and drawings.

DESCRIPTION OF AN EXEMPLARY EMBODIMENT

Figure 1A:
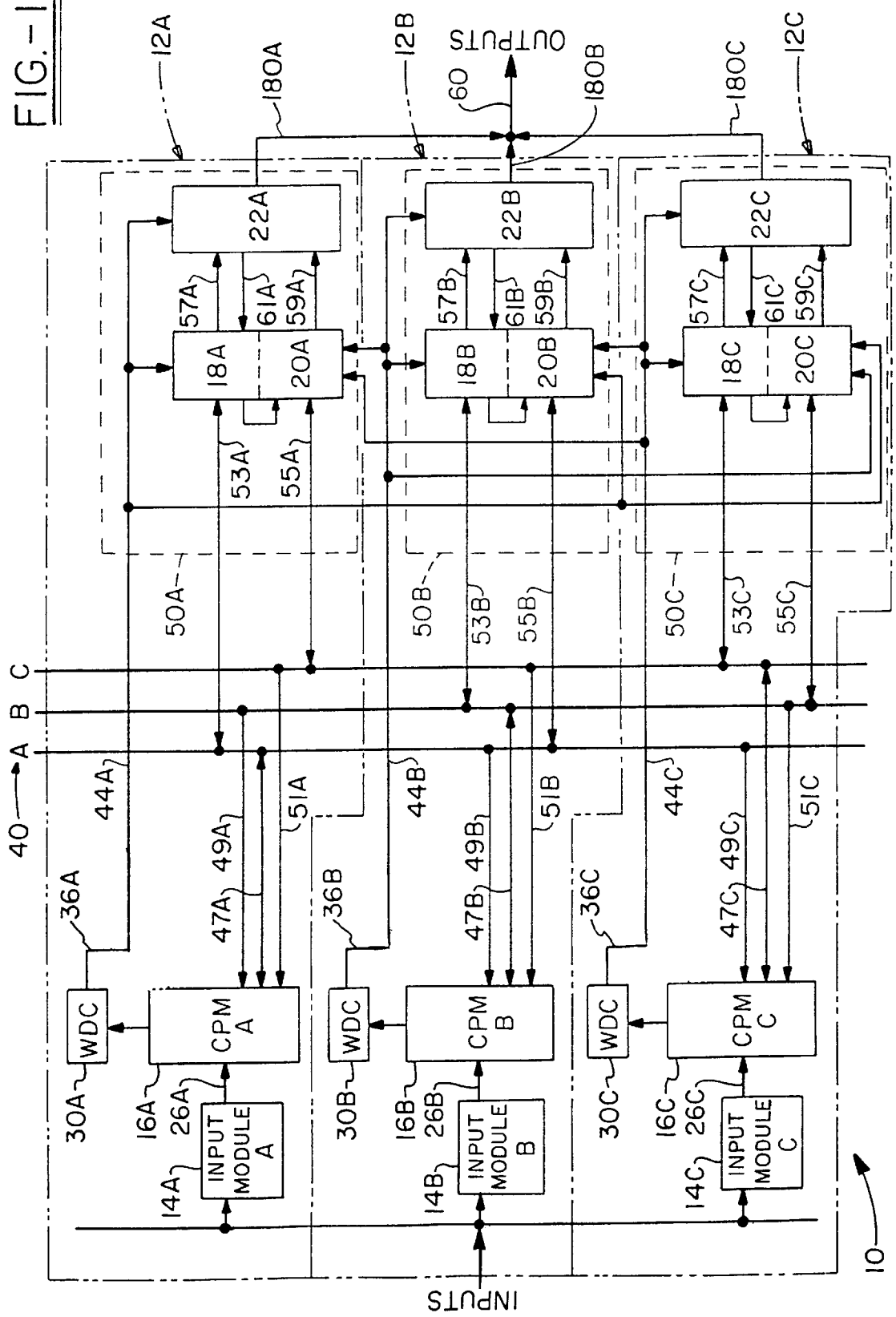
FIG. 1A is a block diagram schematically showing a hybrid multiple redundant computer system according to the present invention.

A hybrid multiple redundant system is referred to generally by the numeral 10 in the accompanying drawings. With reference to FIG. 1A, the system 10 includes first, second, and third processing units, generally referred to by the numeral 12, and separately referred to by number and letter combinations 12A, 12B, and 12C respectively. For convenience, these combinations will be extended to components within the processing units. Specifically, components within the first processing unit will carry the letter "A," second processing unit components the letter "B," and third processing unit components the letter "C."

Each processing unit 12 operates in parallel with the other processing units, and comprises an input module 14, a central processor module 16, and an output module 50. Output module 50 includes a primary output circuit 18, a secondary output circuit 20, and an output voter network 22. Input modules 14 read process data, from many points, and transmit that data to its respective central processor module 16 over input buses 26.

Each central processor module 16 communicates with the output modules 50 over bus 40. The system 10 may operate in a scan-based mode where the system performs control functions on a cyclical basis. In the embodiment shown, three central processor modules 16, one in each processing unit 12, synchronize, once per scan, and communicate with each other in read only mode over buses 40. The central processor module 16 transmits its input data and diagnostic status to the other central processor modules 16 at the same time via bus 40 and lines 47. The central processor module 16 receives input data from the other central processor modules via lines 49 and 51. After that, each central processor module 16 performs two-out-of three voting of the input data and uses the voted data as input to the control program. Each central processor module 16 executes the same control program and sends its output data to the corresponding output modules 50 over bus 40. It will be understood that connections between components within the same processing unit 12 will be referred to as associated components, and connections between components in separate processing units 12 will be referred to as connected to the other or neighboring components. The use of neighbor or neighboring is not indicative of physical location and does not indicate that the connected components are in adjacent processing units. It is merely used to indicate that the connected components are in separate processing units.

With reference to FIG. 1A, the central processor module 16A delivers output data to output modules 50A and 50B overbus 40A. Similarly, the central processor module 16B delivers output data to the output modules 50B and 50C over bus 40B and central processor module 16C delivers output data to output modules 50C and 50A over bus 40C.

Each processing unit 12 further includes a watchdog controller 30 that is connected to the associated central processor module 16. The watchdog controller 30 detects faults within central processor module 16, and upon detecting a fault, activates an alarm signal 44 which is sent to each output module 50. Suitable examples of watchdog controllers are described in the Honeywell Journal for Industrial Automation and Control Supplement, 1996, pp. 22–23. Each output module 50 performs selected logic function among output data received from corresponding central processor modules 16 and alarm signals 44A, 44B, and 44C. In normal system operation, when no alarm signals are activated, each output module 50 produces its output 180 as a logical product of the output data received from the corresponding central processor modules 16. The system output 60 is formed as the logical sum of logical products AC, AB, and BC, where A, B, and C are output data generated by central processor modules 16A, 16B, and 16C respectively. System output 60 is connected to the external devices, such as various actuators (not shown). In normal operation, the system output 60 is given by the equation:

OUTPUT $60 = A\hat{\ }C + A\hat{\ }B + B\hat{\ }C$

The system 10, therefore, performs a two-out-of-three vote among output data produced by the central processor modules 16. In the event that the central processor module 16 fails, the associated watchdog controller 30 activates its alarm signal 44 to disable outputs of the associated output module 50. This alarm signal 44 also allows each other output module 50 to generate output 180 corresponding only to output data produced by its associated central processor module 16. For example, when central processor module 16A fails, the associated watchdog controller 30A activates an alarm signal 44A that disables output 180A in such a way that output 180A will be a logical "0". At the same time, the output modules 50B and 50C receive the alarm signal 44A over line 36A. In response to this signal, the output modules 50B and 50C produce outputs 180B and 180C, as the output data received from central processor module 16B and 16C respectively. The system output 60 is given by:

OUTPUT $60 = B + C$

Hence, in the presence of one central faulty processor module 16, the system 10 is reconfigured from a triple modular configuration to the two-out-of-two (2oo2D) dual redundant configuration. In the presence of two faulty central processor module 16, outputs of both associated output modules 50 are disabled, but the system 10 still operates with one healthy central processor module 16 in a single processing unit configuration. System 10, therefore, still properly operates in the occurrence of faults in any two central processor modules 16. As will become clear as the description proceeds, the system 10 sets the system output 60 in a predetermined safe condition when each central processor module fails.

System fault tolerance within output modules 50 is provided by means within each module 50 comprising a primary output circuit 18, a secondary output circuit 20, and an output network 22. Primary output circuit 18 receives output data from the associated central processor module 16, while the secondary output circuit 20 in the same output module 50 receives output data from selected other central processor module 16. Primary output circuits 18A, 18B, and 18C receive output data from central processor modules 16A, 16B, and 16C over buses 40A, 40B, and 40C and lines 53A, 53B, and 53C respectively. At the same time, the secondary output circuits 20A, 20B, and 20C receive output data from central processor module 16C, 16A, and 16B, over bus 40C, 40A, and 40B and lines 55A, 55B, and 55C respectively.

The primary output circuit 18 receives the alarm signal 44 from its associated watchdog controller 30, while the secondary output circuit 20, in the same output module 50, receives alarm signals 44 from the other two watchdog controllers 30. In this way, primary output circuit 18A receives alarm signal 44A, while secondary output circuit 20A receives alarm signals 44B, 44C. Similarly, primary output circuit 18B receives alarm signal 44B, while secondary output circuit 20B receives alarm signals 44A, 44C. Finally, primary output circuit 18C receives alarm signal 44C, while secondary output circuit 20C receives alarm signals 44A and 44B. Each output voter network 22 receives the same alarm signal as the respective primary output circuit 18. As described more fully below, primary and secondary outputs 18, 20 perform selected but different logic functions with the data received from each central processor module 16 and alarm signals 44.

The output voter network 22 is connected to the outputs of the associated primary and secondary output circuits 18, 20. This output voter network 22 produces the output 180 as a logical product of the output data received from primary and secondary circuits 18, 20. The outputs 180 of the three output voter networks 22 are connected in parallel for producing system output 60 as a logical sum of three logical products generated by the three output voter networks 22. If all central processor modules are healthy, alarm signals 44 are not activated, and when a central processor module 16 fails, its watchdog controller 30 deactivates the corresponding primary output circuit 18 and the output voter network 22 via alarm signal 44 as will become clear from the following description.

The central processor module 16, on the other hand, monitors the status of its primary output circuit 18 and output voter network 22. The central processor module 16, on each scan, reads the status of associated primary output circuit 18 and output voter network 22 over lines 53 and bus 40. In the event that either the primary output circuit 18 or the output voter network 22 fails, the central processor module 16 deactivates both of them by producing an alarm signal 44 for disabling the corresponding output 180. In an alternative embodiment of the system 10 shown in FIG. 1B, each processing unit 12 further includes an OR-gate 38. The first input of which is connected to an additional output 42 of the associated central processor module 16. The second input of the OR-gate 38 is connected to the output 36 of the associated watchdog controller 30. The OR-gate 38 allows an alarm signal 44 to be activated if either the associated watchdog controller 30 or the associated central processor module 16 produces an alarm signal 36, 42 respectively.

Figure 2:
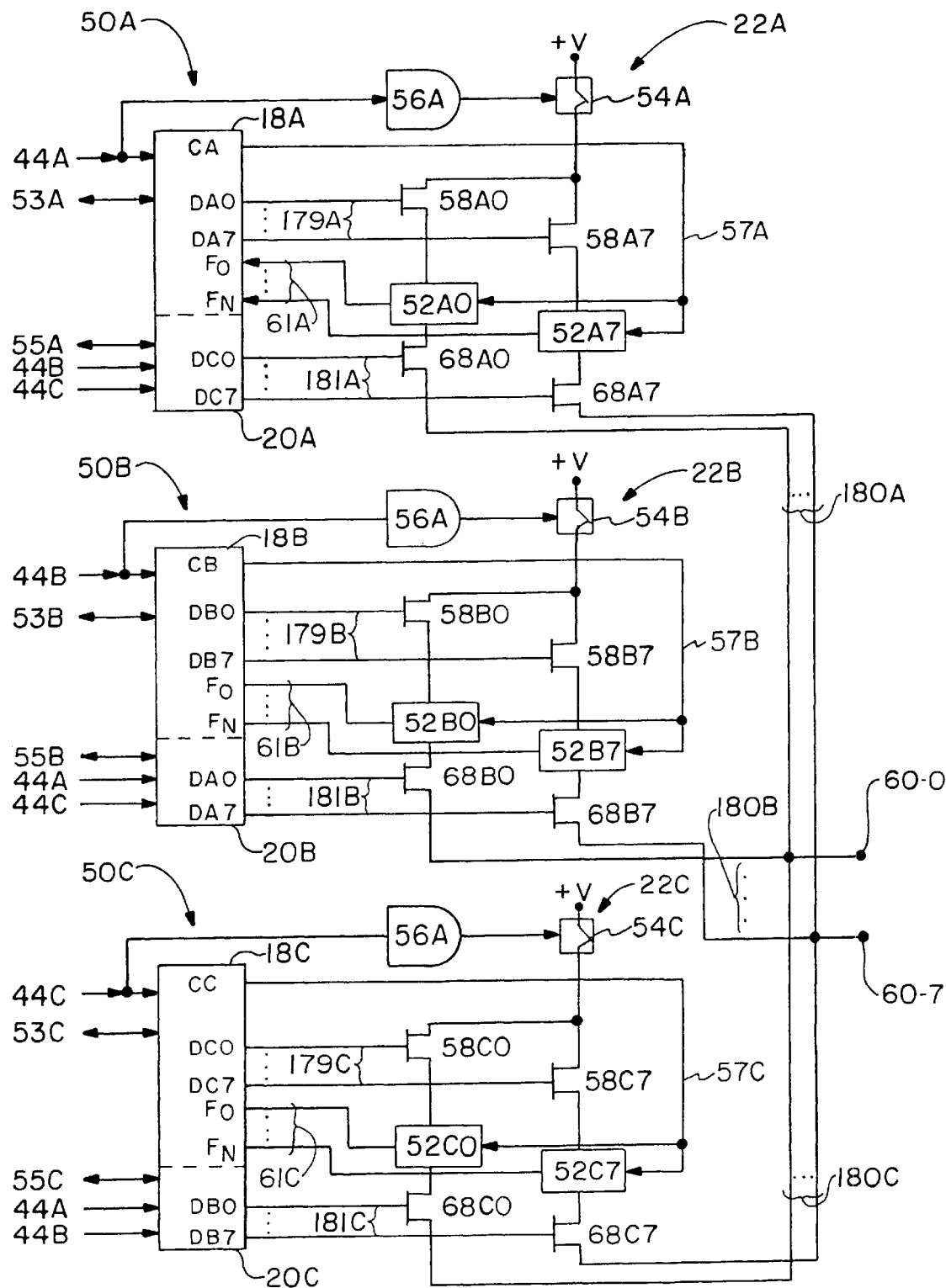
FIG. 2 is a block diagram showing output modules according to the present invention in more detail.

Turning to FIG. 2, the output module 50A includes primary output circuit 18A, secondary output circuit 20A, and output voter network 22A. In the considered embodiment, the system 10 produces a single bit output for each process point. In this way, the system 10 is primarily used for ON-OFF control or as an emergency shutdown system (ESD). The primary output circuit 18A receives the data (DA0 . . . DA7) from the central processor module 16A, over lines 53A, which are connected to the bus 40A. Each bit of data (DA0 . . . DA7) is set by the central processor module 16A according to the control program executed for the corresponding process point. It should be understood that while the description is made in terms of an 8 bits of output data, other output data may be used including but not limited to 16 bit or 32 bits of output data.

Similarly, secondary output circuit 20A receives the data (DC0 . . . DC7) from the central processor module 16C over line 55A. Each bit of data (DC0 . . . DC7) is set by central processor module 16C according to the control program executed for the corresponding process point. The primary output circuit 18A also receives the alarm signal 44A from the central processor module 16A, while the secondary output circuit 20A receives alarm signals 44B and 44C from central processor modules 16B and 16C, respectively.

The output voter network 22A includes multiple pairs of electronic valves, referred to as switch 58A and switch 68A respectively. Switches 58A and 68A within each pair are connected in series and each of the pairs are connected by one side to an external power supply over a fault recovery switch 54A, and each of the pairs is separately connected by its other side to the corresponding output 180A of output module 50A for providing single-bit output 180A for each process point. Each switch 58A is controlled by respective output 179A of the primary output circuit 18A, while each switch 68A is controlled by respective output 181A of the secondary output circuit 20A. The output 180A is energized if both switches 58A and 68A in series are ON and de-energized if at least one of the switches is OFF.

The output module 50A also includes a fault recovery valve or switch 54A that is controlled by the alarm signal 44A via a driver 56A. The fault recovery valve 54A may be opened by an active alarm signal 44A over driver 56A and allows each output 180A to be disconnected from system output 60, as described below.

The output voter network 22A also includes a current sensor 52A per point that is activated by the primary output circuit 18A via signal CA over line 57A. The current sensors 52A generate feedback signals, over lines 61A, to inform each central processor module 16 via primary output circuit 18A about the current flowing through each pair of electronic valves 58A and 68A. Single fault recovery switch 54A can be opened by an active alarm signal 44A over a driver 56A and allows each output 180A to be disconnected from system outputs 60, as it will be shown later as the description proceeds. In normal operation, the alarm signal 44A keeps the fault recovery switch 54A ON. The output modules 50 of the system 10 are identical, thus the other output modules 50B and 50C include the same parts that were described with respect to the output module 50A.

The primary output circuit 18A performs a selected logical function and produces outputs 179A each controlling respective electronic valve 58A of the output voter network 22A. Secondary output circuit 20A performs another selected logical function and produces outputs 181A. Each output 181A controls a respective electronic valve 68A of the output voter network 22A. The primary output circuit 18B and primary output circuit 18C perform a similar logic function as primary output circuit 18A and produce outputs 179B and 179C, respectively. Secondary output circuit 20C and secondary output circuit 20B perform similar logic function as secondary output circuit 20A to produce outputs 181B and 181C respectively.

Figure 3:
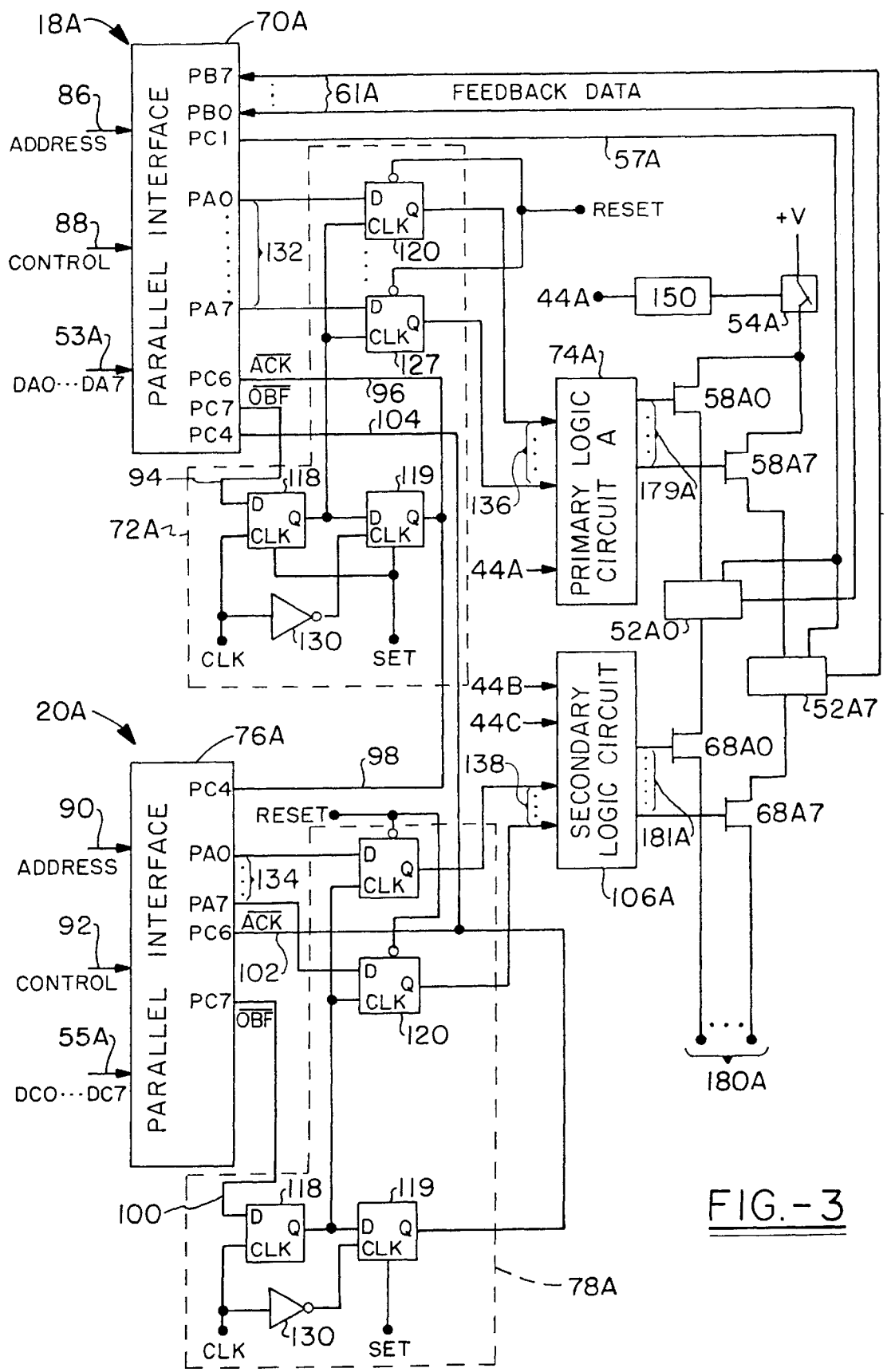
FIG. 3 is a more detailed block diagram of the output module of FIG. 2 showing the components thereof.

FIG. 3 depicts the primary and the secondary output circuit configuration. For simplicity, FIG. 3 only shows parts that are related to the output module 50A. The other output modules 50B and 50C include the same parts. The primary output circuit 18A includes programmable interface 70A, a control circuit 72A, and a primary logic circuit 74A. Secondary output circuit 20A includes a programmable interface 76A, a control circuit 78A, and a secondary logic circuit 106A. It should be understood that output circuits 18A and 20A may include identical programmable interfaces 70A, 76A and identical control circuits 72A, 78A, but their output logic circuits 74A and 106A are different. Outputs 179A and 181A of primary logic circuit 74A and secondary logic circuit 106A control electronic valves 58A and 68A, respectively. The central processor module 16A writes data (DA0 . . . DA7) to the programmable interface 70A over bi-directional lines 53A. The central processor module 16A also uses these lines when it reads feedback data 61A of current sensors 52A via the programmable interface 70A. The current sensors 52A are activated by control signal on line 57A providing feedback data for the central processor module 16A.

The central processor module 16A activates writing and reading data processes by sending appropriate address and control signals to the programmable interface 70A using address lines 86 and control lines 88 respectively. The central processor module 16C uses address lines 90 and control lines 92 for the same purpose. Lines 86, 88 and 90, 92 are connected to the central processor module 16A across bus 40A and to the central processor module 16C across bus 40C respectively. The programmable interfaces 70A and 76A are standard parallel peripheral interfaces that are programmed by central processor modules 16A, 16C respectively to provide bi-directional communication with the output module 50A. Each interface has three 8-bit ports that can be addressed separately. The first, second, and third ports include bits (PA0 . . . PA7), (PB0 . . . PB7), and (PC0 . . . PC7) respectively. First and second ports (PA0 . . . PA7) and (PB0 . . . PB7) are used for output and feedback data transfer, while port (PC0 . . . PC7) are used to transfer control signals. It should be readily understood that other interfaces, such as 16-bit or 32-bit interfaces, may be used to increase the system performance.

The control circuit 72A includes D-type flip-flops 118, 119 and it further includes flip-flops 120, 121, 122, 123, 124, 125, 126, 127, and an inverter 130. It should be readily understood that other flip-flops may be substituted, for example, J flip-flops. The input of each flip-flop 120–127 is connected to the corresponding bit of first port (PA0 . . . PA7) via leads 132. Input data in each flip-flop 120–127 is transferred to its output on the HIGH to LOW transition of the output of flip-flop 118. The output of flip-flop 118 is also connected to the input of the flip-flop 119 that produces an acknowledge signal (ACK). The ACK signal from flip-flop 119 goes to input PC6 of the programmable interface 70A over lead 96 and to input PC4 of the programmable interface 76A over line 98.

Both flip-flops 118 and 119 are clocked at a regular rate by a clock oscillator (not shown in FIG. 3) that cyclically produces non-inverted and inverted clock impulses. Inverted clock impulses are produced via inverter 130. Control signal PC7 on the D input of flip-flop 118 is transferred to the output of flip-flop 118 on the LOW to HIGH transition of the clock impulse. Then, output of flip-flop 118 is transferred to output of flip-flop 119 on the LOW to HIGH transition of the inverted clock impulse. Outputs of both flip-flops 118, 119 are initially set HIGH by a conventional circuit (not shown).

The central processor module 16A writes output data (DA0 . . . DA7) to the programmable interface 70A, over lines 53A. The programmable interface 70A stores that data to the port (PA0 . . . PA7) and sets an output buffer full signal (OBF) across PC7 on lead 94. In response, the output of flip-flop 118 is passed from a HIGH to a LOW condition, such that data (DA0 . . . DA7) are written to outputs of flip-flop 120–127. After that, the control circuit 72A sets an acknowledgment signal (ACK) on lead 96. The ACK signal informs central processor module 16A that a new data word can be transmitted to the interface 70A. The control circuit 72A also transmits the ACK signal to an input of the programmable interface 76A over lead 98. It tells central processor module 16C that the central processor module 16A has finished sending the output data to the primary output circuit 18A.

Similarly, the programmable interface 76A transfers the PC7 output buffer full signal (OBF) to the input of corresponding flip-flop 118 in control circuit 78A, on a lead 100, and the control circuit 78A returns the acknowledgment signal (ACK) over lead 102. The control circuit 78A also transmits an ACK signal to input PC4 of the programmable interface 70A over lead 104. It informs central processor module 16A that the central processor module 16C has finished sending the output data to the secondary output circuit 20A.

The control circuit 72A transmits data (DA0 . . . DA7) to the primary logic circuit 74A over lines 136, while the control circuit 78A transmits data (DC0 . . . DC7) to the secondary logic circuit 106A over lines 138. The primary logic circuit 74A produces outputs 179A as the result of a selected logic operation with each bit of data (DA0 . . . DA7) and alarm signal 44A. The secondary logic circuit 106A produces outputs 181A as a result of the selected logical operation with each bit of data (DC0 . . . DC7) and the alarm signals 44B and 44C. The primary logic circuit 74A and secondary logic circuit 106A drives electronic valves 58A and 68A of the output voter network 22A respectively. The primary logic circuit 74A and the secondary logic circuit 106A are shown in FIG. 5, and described in more detail below.

Figure 4:
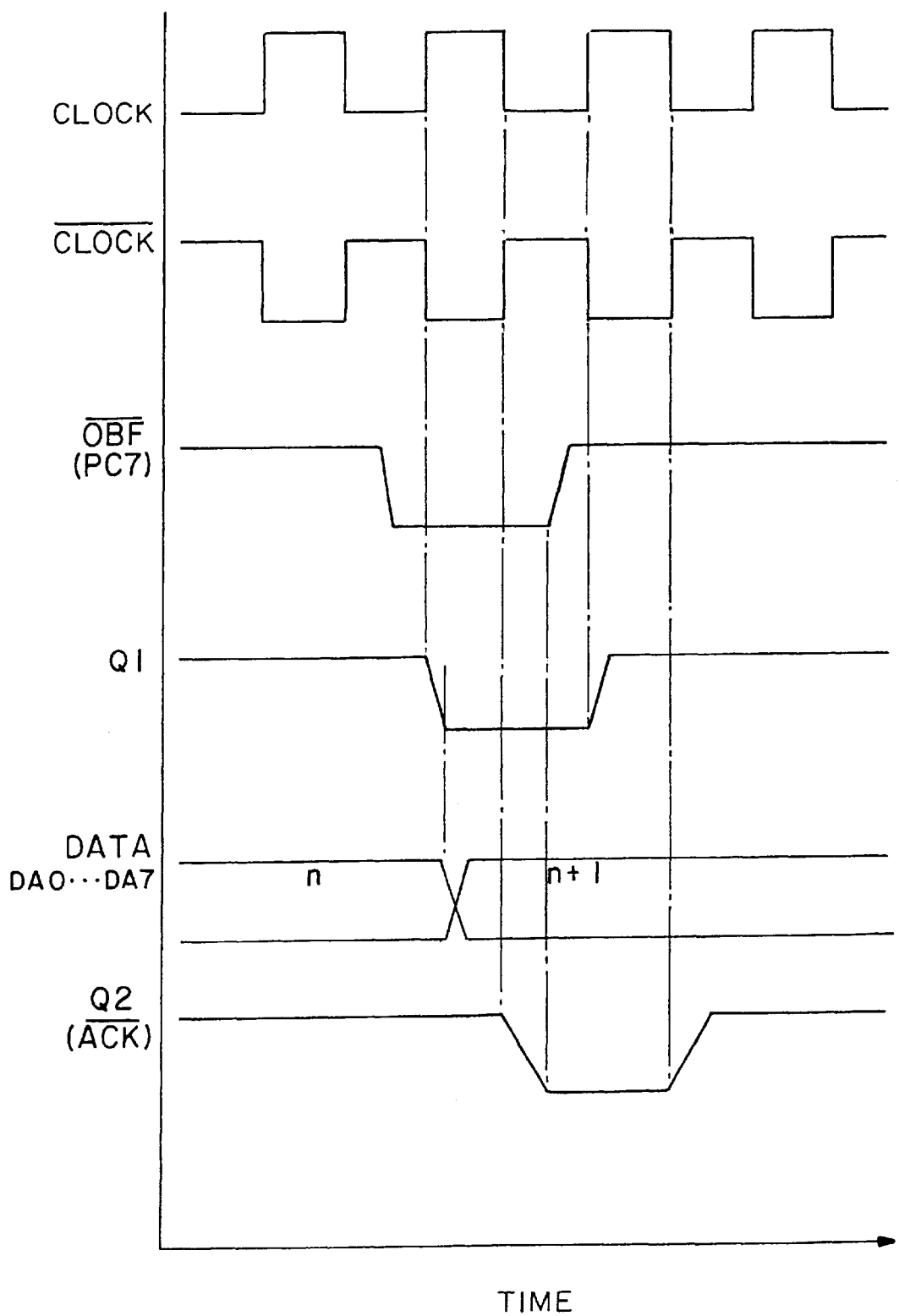
FIG. 4 is a timing diagram of a parallel interface and control circuit within the output module of FIG. 2 showing the synchronization between the interface and control circuit.

Referring to FIGS. 3 and 4, further details of the control circuit 72A operation shall be described. As can be appreciated, control circuit 78A operates in similar fashion. As shown in FIG. 4, Q1, and Q2 (ACK) outputs of the flip-flops 118 and 119 are initially in HIGH states. Data (DA0 . . . DA7) represent the outputs 136 of flip-flops 120–127. Once the central processor module 16A has written data to the port (PA0 . . . PA7), the programmable interface 70A sets a logical "0" output buffer full signal PC7 on the input of the flip-flop 118. That signal is transferred to the output Q1 of the flip-flop 118 when the nearest clock impulse changes from LOW to HIGH. In turn, the HIGH to LOW transition of the Q1 will write data (DA0 . . . DA7) from port (PA0 . . . PA7) to the flip-flops 120–127. The data (DA0 . . . DA7), over lines 136, are then transferred to the primary logic circuit 74A. LOW output Q1 of flip-flop 118 then will transfer to output Q2 (ACK) of the flip-flop 119 when the nearest inverted clock impulse transits from LOW to HIGH.

As soon as Q2 (ACK) signal, across line 96, becomes LOW, the programmable interface 70A restores the HIGH condition of the output buffer full (OBF) signal on line 94. Similarly, the programmable interface 76A restores the HIGH condition of the output buffer full (OBF) signal on lines 100 as soon as the ACK signal occurred on line 102 becomes LOW. Both control circuit 72A and 78A will return to its initial condition when the nearest clock signal restores HIGH level of Q1 and then nearest inverted clock signal restores HIGH level of the ACK signal. After that, new data (DA0 . . . DA7) can be written to flip-flops 120–127 from interface 70A and 76A.

Figure 5:
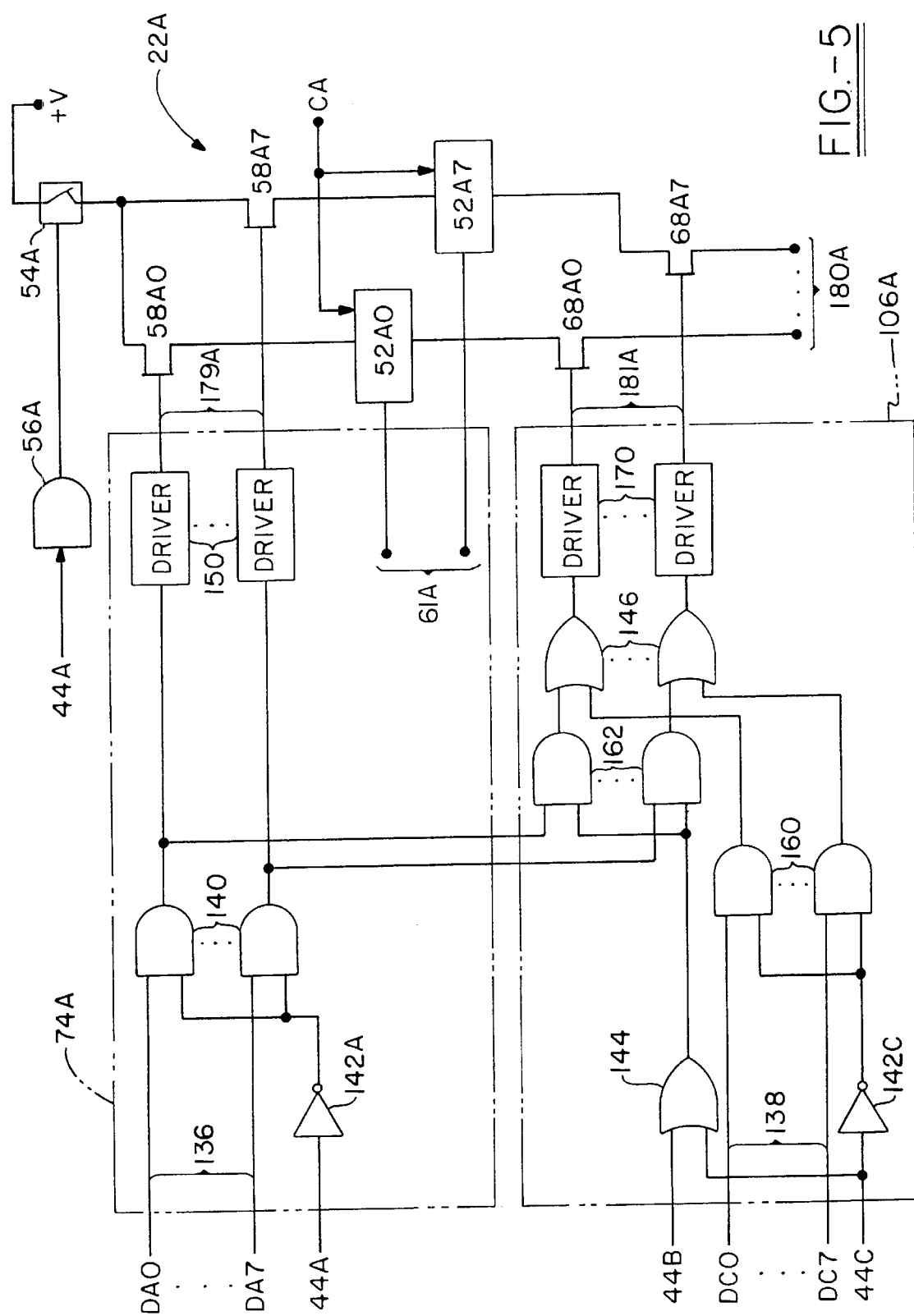
FIG. 5 is a detailed diagram of the primary and secondary logic circuits of the output module of FIG. 2.

FIG. 5 depicts a schematic diagram of the primary logic circuit 74A and the secondary logic circuit 106A that are included in the output module 50A. As can be appreciated, the neighboring output modules 50B and 50C include the same primary and secondary logic circuits. The primary logic circuit 74A includes AND gates 140 and an inverter 142A. Input of each gate 140 is connected to a corresponding output 136 of flip-flops 120–127 related to the control circuit 72A, as it is shown in FIG. 3. Another input of each gate 140 is connected to the inverter 142A that inverts the alarm signal 44A. Outputs of gates 140 are connected to drivers 150 and to inputs of AND gates 162 in the secondary logic circuit 106A. Each driver 150 controls the corresponding electronic valve 58A. The other input of each gate 162 is connected to OR gate 144 that generates a logical sum of 44B and 44C alarm signals.

Outputs of gates 162 are connected to inputs of OR gates 146. Another input of each gate 146 is connected to the corresponding output of AND gates 160. Input of each gate 160 is connected to a corresponding output 138 of flip-flops 120–127 related to the control circuit 78A, as shown in FIG. 3. Another input of each gate 160 is connected to the inverter 142C, which inverts the alarm signal 44C. Outputs of gates 146 are connected to drivers 170 that control electronic valves 68A.

In normal operation, alarm signals 44A, 44B, and 44C are not activated and are in a logical "0" condition, hence the inverters 142A and 142C produce a logical "1" output. This allows data (DA0 . . . DA7) and (DC0 . . . DC7) to be transmitted via AND gates 140, 160 to the drivers 150, 170 respectively. In general, the logical function implemented by the primary logic circuit 74A for any I-output 179 is given by:

$$AAI = DAI \cdot \underline{ASA} \qquad (1)$$

where DAI is any I-output 136, AAI is the corresponding I-output 179A and $\underline{ASA}$ is the inverted alarm signal 44A. When the alarm signal 44A is in a logical "0," AAI equals DAI and the data (DA0 . . . DA7) are transmitted on outputs 179A of the primary logic circuit 74A as signals (AA0 . . . AA7). Outputs 179A are also the outputs of the primary output circuit 18A, which includes the primary logic circuit 74A as shown in FIG. 3. Similarly, the signals (CA0 . . . CA7) across lines 181A are the outputs of the secondary output circuit 20A. The logical function implemented by the secondary output circuit 20A for any output is given by:

$$ACI = DCI \cdot \underline{ASC} + (DAI \cdot \underline{ASA}) \cdot (ASB + ASC) \qquad (2)$$

where DCI is any I-input 138 and ACI is the corresponding I-output 181, ASB and ASC are the alarm signals 44B and 44C respectively, and $\underline{ASA}$ and $\underline{ASC}$ are the inverted alarm signals 44A (ASA) and 44C (ASC).

Equations 1 and 2 represent logical functions implemented by the primary and secondary output circuits 18A and 20A respectively. The primary output circuit 18A sets each switch 58A ON or OFF in accordance with the corresponding bits of data (DA0 . . . DA7) received from central processor module 16A when alarm signal 44A is not activated. In the event that the alarm signal is activated, passing a logical "1" condition, the primary output circuit 18A sets each switch 58A OFF, thereby de-energizing all outputs 180A. The secondary logic circuit 20A sets each switch 68A ON or OFF in accordance with corresponding bits of data (DC0 . . . DC7) received from central processor module 16C when each alarm signal 44 is not activated. Equation 2, in that case, will transform to:

$$ACI = DCI$$

In the event that either alarm signal 44C or both signals 44B and 44C are activated, Equation 2 is given by:

$$ACI = DAI$$

Therefore, the secondary output 20A transfers control over all switches 68A to the primary output circuit 18A. Another situation appears when the alarm signal 44B is activated. In that event, the secondary output circuit 20A produces output signal ACI on line 180A as a logical sum of output data received from central processor modules 18A and 18C:

$$ACI = DCI + DAI$$

Output 180A will energize over open switches 58A and 68A if both signals AAI and ACI are in a logical "1." The output 180A, however, will de-energize if either AAI or ACI output are in a logical "0" because the corresponding switch 58A or 68A will be OFF. Therefore, the output voter circuit 22A produces the logical product of each bit of the outputs AAI and ACI. Consequently, any output 180A is represented by the following expression:

$$\text{Output } 180A = AAI \cdot ACI \qquad (3)$$

After substituting equations (1) and (2) into equation (3), the output 180A becomes:

$$\text{Output } 180A = (DAI \cdot \underline{ASA}) \cdot (DCI \cdot \underline{ASC} + (DAI \cdot \underline{ASA}) \cdot (ASB + ASC)) \qquad (4)$$

As can be appreciated, the logical function for primary output circuit 18B and primary output circuit 18C is similar to primary output circuit 18A function because the primary output circuits 18 in each output module 50 are identical. Primary output circuit 18B and primary output circuit 18C functions are respectively given by:

$$BBI = DBI \cdot \underline{ASB} \qquad (5)$$

$$CCI = DCI \cdot \underline{ASC} \qquad (6)$$

DBI and BBI are respective input and output signals of the primary output circuit 18B. DCI and CCI are respective input and output signals of the primary output circuit 18C. $\underline{ASB}$ and $\underline{ASC}$ are the inverted alarm signals 44B and 44C respectively. The logical functions used by secondary output circuit 20B and secondary output circuit 20C are similar to secondary output circuit 20A function, because the secondary output circuits 20 in each output module 50 are identical. The function of secondary output circuit 20B is given by:

$$ABI = DAI \cdot \underline{ASA} + (DBI \cdot \underline{ASB}) \cdot (ASA + ASC) \qquad (7)$$

DBI and ABI are respective input and output signals of the secondary output circuit 20B.

Secondary output circuit 20C function is given by:

$$BCI = DBI \cdot \underline{ASB} + (DCI \cdot \underline{ASC}) \cdot (ASA + ASB) \qquad (8)$$

DCI and BCI are respective input and output signals of the primary output circuit 18C.

Output 180B and Output 180C related to output modules 50B and 50C respectively are represented by an expression similar to the Output 180A (expression 3):

$$\text{Output } 180B = BBI \cdot ABI \qquad (9)$$

$$\text{Output } 180C = CCI \cdot BCI \qquad (10)$$

After incorporating equations (5) and (7) into equation (9), output 180B becomes:

$$\text{Output } 180B = (DBI \cdot \underline{ASB}) \cdot (DAI \cdot \underline{ASA} + (DBI \cdot \underline{ASB}) \cdot (ASA + ASC)) \qquad (11)$$

Similarly, substituting equations (6) and (8) into equation (10), produces an output 180C as follows:

$$\text{Output } 180C = (DCI \cdot \underline{ASC}) \cdot (DBI \cdot \underline{ASB} + (DCI \cdot \underline{ASC}) \cdot (ASA + ASB)) \qquad (12)$$

Referring to FIGS. 1–3, the system operates as follows. Input modules 14 read the same process data for each process point from many controlled points, and transmit that information to a respective central processor module 16 over input buses 26. Once per scan, central processor modules 16 synchronize and communicate with each other as well as with output modules 50 via communication buses 40. Three central processor modules 16 perform a two-out-of-three software vote of the input data received from three input modules 14. Each central processor module 16 then uses the voted data as input to a control program. In this way, the system masks potential input faults that could propagate into the control program calculation. Each central processor module 16 executes the same control program and produces a single bit output per controlled point. The central processor module 16 then sends output data to its associated primary output circuit 18 and to the secondary output circuit 20 of the neighboring output module 50. As shown in FIG. 2, each voting path of the output voter network 22 includes electronic valves 58, 68, in series. Each voting path is connected in parallel with the respective paths of two other output voter networks 22. The system output 60 will energize if at least one out of three output 180 will energize. Consequently, the system output 60 that related to any controlled point is defined as a logical sum of three outputs:

$$\text{Output } 60 = \text{output } 180A + \text{output } 180B + \text{output } 180C, \tag{13}$$

Outputs 180A, 180B, and 180C are given by equations (4), (11), and (12) respectively. In normal operation, each alarm signal is in a logical "0" condition. Consequently, the inverted ASA, ASB, and ASC signals are in a logical "1" condition and outputs 180A, 180B, and 180C (equations (4), (11) and (12)) become:

$$\text{Output } 180A = DAI^\frown DCI \tag{14}$$

$$\text{Output } 180B = DBI^\frown DAI \tag{15}$$

$$\text{Output } 180C = DCI^\frown DBI \tag{16}$$

The system output 60 will given by:

$$\text{Output } 60 = DAI^\frown DCI + DBI^\frown DAI + DCI^\frown DBI \tag{17}$$

If any two out of three central processor modules 16 set their outputs in a logical "1" state, the system output 60 will be ON. Similarly, if any two central processor modules 16 set their outputs in a logical "0" state, the system output 60 will be OFF. Therefore, under normal system operation, the system performs a two-out-of-three (2-of-3) vote among the output data of the three central processor modules 16. Majority voting allows the system to mask multiple transient faults that could be left undetected. Permanent hardware and software failures of system components as well as many transient faults are detected by system diagnostics.

Referring to FIG. 1A, now consider the system behavior in the presence of a fault in one central processor module 16. In the event that a central processor module 16A fails, its respective watchdog controller 30A activates alarm signal 44A setting that signal to a logical "1". Consequently, the ASA signal 44A will be in a logical "1" and the ASA signal will be in a logical "0" condition. ASB and ASC alarm signals, however, will remain in a logical "0" so their inverted values will be in a logical "1". Outputs 180A, 180B, and 180C (equations 4, 11, and 12) will then changed as follows:

$$\text{Output } 180A = \text{``0''} \tag{18}$$

$$\text{Output } 180B = DBI^\frown DBI = DBI \tag{19}$$

$$\text{Output } 180C = DCI^\frown(DBI + DCI) = DCI \tag{20}$$

In the event that the central processor module 16A fails, the system output 60 is given by:

$$\text{Output } 60 = \text{output } 180B + \text{output } 180C = DBI + DCI \tag{21}$$

In the event that the central processor module 16A fails, the output module 50A is deactivated but system output 60 is still controlled by central processor 16B and 16C. In that case, the central processor module 16B drives both electronic valves 58B and 68B of the output voter network 22B, while the other central processor module 16C drives both switches 58C and 68C of the output voter network 22C. In the presence of a fault of the central processor module 16A the system operates with two central processor modules 166B and 16C and the system performs 2-of-2 voting among the output data of these central processor modules. The 2-of-2 voting means that both 16B and 16C central processor modules must give a logical "0" output to make a shutdown.

The system output 60, in the event that the central processor module 16B fails, is defined by using the same method shown above for failure of central processor module 16A. The same method is also used for the system output 60 definition in the event that the central processor module 16C fails. In the event that the central processor module 16B fails, the system output 60 is given by:

$$\text{Output } 60 = \text{output } 180A + \text{output } 180C = DAI + DCI \tag{22}$$

In the event that the central processor module 16C fails, the system output 60 is given by:

$$\text{Output } 60 = \text{output } 180A + \text{output } 180B = DAI + DBI \tag{23}$$

In the event that the central processor module 16B fails, the output module 50B is deactivated, and system output 60 is controlled by central processor 16A and 16C. In that case, the central processor module 16C drives both electronic valves 58C and 68C of the output voter network 22C, while the central processor module 16A drives both electronic valves 58A and 68A of the output voter network 22A. In the presence of a fault of the central processor module 16B, the system operates with two central processor modules 16A and 16C and the system performs 2-of-2 voting among the output data of these central processor modules. The 2-of-2 voting means that both 16A and 16C central processor modules must give a logical "0" output to make a shutdown.

In the event that the central processor module 16C fails, the output module 50C is deactivated but system output 60 is still controlled by central processor 16A and 16B. In that case, the central processor module 16A drives both electronic valves 58A and 68A of the output voter network 22A, while the central processor module B drives both electronic valves 58B and 68B of the output voter network 22B. In the presence of fault of the central processor module 16C, the system operates with two central processor modules 16A and 16B and the system performs 2-of-2 voting among the output data of these central processor modules. The 2-of-2 voting means that both 16A and 16B central processor modules must give a logical "0" output to make a shutdown.

Now consider the system behavior in the presence of fault that can occur concurrently in two central processor modules 16. In the case that central processor modules 16A and 16B fail concurrently, watchdog controllers 30A and 30B respectively set alarm signals 44A and 44B to a logical "1". The alarm signal 44C, however, remains in a logical "0," and its inverted signal is a logical "1." Outputs 180A, 180B, and 180C (equations 4, 11, and 12) will then changed as followed:

$$\text{Output } 180A = \text{``0''} \tag{24}$$

$$\text{Output } 180B = \text{``0''} \tag{25}$$

$$\text{Output } 180C = DCI^\frown DCI = DCI \tag{26}$$

In the event that the central processor module 16A and 16B fails, output modules 50A and 50B are deactivated, but system output 60 is still controlled by the central processor module 16C. In that case, the central processor module 16C drives both electronic valves 58C and 68C of the output voter network 22C. The system output 60, in the event that the central processor module 16A and 16B fails, is given by:

$$\text{Output } 60 = \text{output } 180C = DCI \qquad (27)$$

If the central processor module 16A and 16C concurrently fail, the system output 60 is similarly defined, due to the symmetrical system configuration, as:

$$\text{Output } 60 = \text{output } 180B = DBI \qquad (28)$$

In that event, output modules 50A and 50C are deactivated, and central processor module 16B controls the system output 60. In that case, the central processor module 16B drives both electronic valves 58B and 68B of the output voter network 22B. The system output 60 in the event that the central processor module 16B and 16C concurrently fails is also defined similarly because of symmetrical system configuration as:

$$\text{Output } 60 = \text{output } 180A = DAI \qquad (29)$$

In the event, that three central processor modules 16 fail at the same time all output modules 50 are deactivated and the system makes the shutdown. Therefore, it takes a minimum of three faulty central processor modules 16 to shut the controlled process down. In the presence of any two faulty central processor modules 16, the system remains operational via the third healthy central processor module 16. All possible faults of central processor modules 16 and system outputs 60 for each combination of these faults are shown on the Table 1.

TABLE 1

| CPM A | CPM B | CPM C | ASA | ASB | ASC | OUTPUT |
|---|---|---|---|---|---|---|
| Good | Good | Good | 0 | 0 | 0 | DAI^DCI + DBI^DAI + DCI^DBI + |
| Failure | Good | Good | 1 | 0 | 0 | DBI + DCI |
| Good | Failure | Good | 0 | 1 | 0 | DAI + DCI |
| Good | Good | Failure | 0 | 0 | 1 | DAI + DBI |
| Failure | Failure | Good | 1 | 1 | 0 | DCI |
| Good | Failure | Failure | 0 | 1 | 1 | DAI |
| Failure | Good | Failure | 1 | 0 | 1 | DBI |
| Failure | Failure | Failure | 1 | 1 | 1 | Safe failure (Shutdown) |

With reference to FIG. 2, now consider the system behavior in the presence of watchdog controller faults. In the event that one watchdog controller 30 fails, its alarm signal 44 can be stuck either in a logical "1" or in a logical "0" state. In the first case, the system's response will be the same as it was shown above for one central processor module 16 failure. In that case, the respective output module 50 is deactivated, but two other output modules 50 are still controlled by two respective central processor modules 16, each of which has a healthy watchdog controller 30. In this way, if two watchdog controllers 30 fail concurrently, the two respective output modules 50 are deactivated, but the third output module 50 is still controlled by its respective central processor module 16. In the event that three watchdog controllers 30 fail each holding a logical "1" alarm signal 44, all output modules 50 are deactivated and the system makes the shutdown. When the watchdog controller 30 fails and holds its alarm signal 44 in a logical "0", the system operation will not changed. The faulty watchdog controller 30, however, will not be able to discover a possible fault that can occur in the central processor 16.

Referring to FIG. 2, now consider the system behavior when both central processor module 16 and its watchdog controller 30 fail. In that event, the primary output circuit 18 and any secondary output circuit 20 can hold the output data received from the corresponding central processor module 16 before it failed. Each bit of the data held on lines 179, 181 can either be in a logical "1" or "0" state. The outputs 180 will depend on a logical level of these bits, as well as what logical signal is held on the outputs of the failed watchdog controller 30 and failed central processor module 16. If, for example, the central processor module 16A produced output data with a DAI="1" before it failed, that respective bit of output data AAI on lines 179 remains in a logical "1" condition. Assuming that the central processor module 16A and the watchdog controller 30A fail in such a way that the AAI="1" and alarm signal 44A (ASA) holds a logical "0", the outputs 180A, 180B, and 180C (equations 4, 11, and 12) become:

$$\text{Output } 180A = DAI \cdot DCI = (\text{``1''}) \cdot DCI = DCI \qquad (30)$$

$$\text{Output } 180B = DBI \cdot DAI = DBI \cdot (\text{``1''}) = DBI \qquad (31)$$

$$\text{Output } 180C = DCI \cdot DBI \qquad (32)$$

The system output 60 will be given by:

$$\text{Output } 60 = DCI + DBI + DCI \cdot DBI = DBI + DCI \qquad (33)$$

If any associated central processor module 16 and watchdog controller 30 fail concurrently, the system will similarly degrade, because of its symmetrical configuration. All possible combinations of the central processor module 16A fault, its watchdog controller 30A fault (WDA), and the system output for each combination are shown on Table 2.

TABLE 2

| CPM A faults | WDA faults | System Output |
|---|---|---|
| DAI = "0" | ASA = "0" | DBI ^ DCI |
| DAI = "0" | ASA = "1" | DBI + DCI |
| DAI = "1" | ASA = "0" | DBI + DCI |
| DAI = "1" | ASA = "1" | DBI + DCI |

Another, but similar situation appears when the central processor module 16 and the watchdog controller 30 belonging to different processing units 12 fail concurrently. All possible combinations of the central processor module 16A fault, the watchdog controllers 30B and 30C faults, (WDB) and (WDC), and the system output for each combination are shown on Table 3 and Table 4.

TABLE 3

| CPM A faults | WDB faults | System Output |
|---|---|---|
| DAI = "0" | ASB = "0" | DBI + DCI |
| DAI = "0" | ASB = "1" | DCI |
| DAI = "1" | ASB = "0" | DBI + DCI |
| DAI = "1" | ASB = "1" | DCI |

TABLE 4

| CPM A faults | WDC faults | System Output |
|---|---|---|
| DAI = "0" | ASC = "0" | DBI + DCI |
| DAI = "0" | ASC = "1" | DBI |
| DAI = "1" | ASC = "0" | DBI + DCI |
| DAI = "1" | ASC = "1" | DBI |

As shown, the occurrence of faults in any two central processor modules 16 as well as any combination of two watchdog controller 30 faults or one central processor module 16 and one watchdog controller 30 fault will not cause the system failure.

With reference to FIGS. 3 and 5, now consider how some faults that can occur in the output voter network 22 or in the output logic circuits 74 and 106 impact to the system operation.

The output voter network 22 has two switches 58, 68 in series per point. If any two switches 58, 68, in series, related to the same point fail open the system 10 still operates. If, for example, the switches 58A, 58B of the output network 22A and the output voter network 22B respectively fail open, the system 10 will drive outputs 180 via electronic valves 58C and 68C of output voter network 22C. Therefore, it takes three faulty-open electronic valves 58 or 68 to shut the controlled process down.

In the event that both switches 58 and 68 in series in any output voter network 22 fail short, the corresponding output 180 as well as the system output 60 would fail ON, causing a system failure. The central processor module 16, however, monitors the status of switches 58 and 68 during each scan. Before sending output data to output module 50, the central processor module activates all current sensors 52 via parallel interface 70 over line 57. Each current sensor 52 generates a feedback signal over line 61 to inform the central processor module 16 about the current flowing through each pair of switches 58 and 68. Consequently, the central processor module 16 recognizes if both switches 58 and 68 fail short. In that event, the central processor module 16 sends a predetermined message to the associated watchdog controller 30, causing watchdog controller 30 to activate its alarm signal 44 de-energizing all outputs 180 in the associated output voter network 22 by setting fault recovery valve 54 OFF. The system, however, will still operate with two other output voter networks 22 where switches 58 and 68 are still healthy.

Figure 1B:
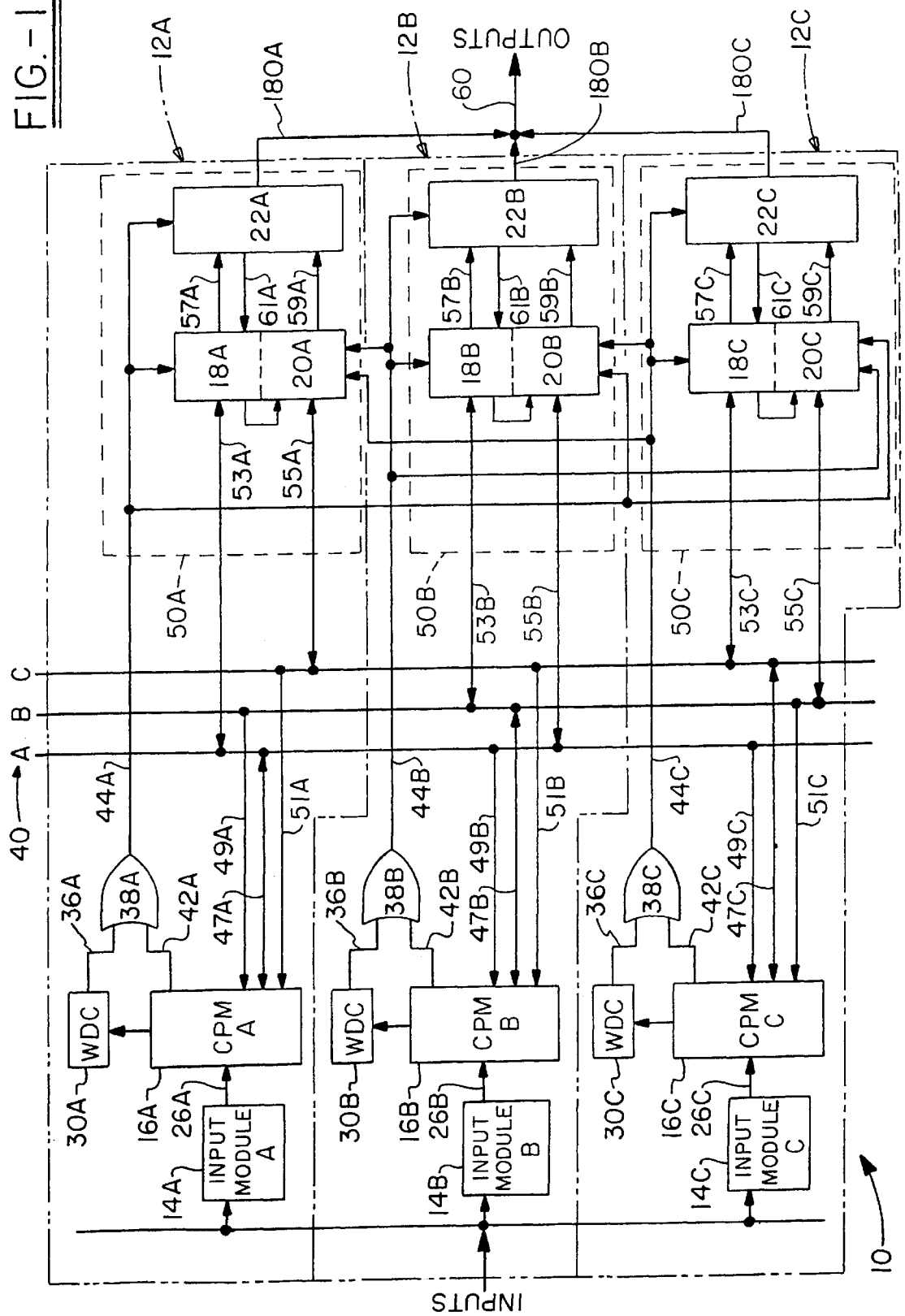
FIG. 1B is a block diagram schematically showing a hybrid multiple redundant system according to an alternative embodiment of the present invention.

In an alternative embodiment of the system 10 shown in FIG. 1B, the central processor module 16 produces its own alarm signal 42 when switches 58 and 68 fail short in the corresponding output voter network 22. When a faulty short condition of both electronic valves 58 and 68 is discovered, the central processor module 16 sets the error signal 42 in a logical "1". It activates the alarm signal AS that opens the fault recovery electronic valve 54 over driver 150 disconnecting the faulty output voter network 22 from the system output 60. The system 10, however, still operates with remaining two output modules 50, where output voter networks 22 are still healthy. Therefore, the presence of any two shorts within switches 58, 68 will not cause system failure. The system 10 shuts down only if both switches 58 and 68 related to the same point fail short in each output voter network 22.

System output recovers from switches 58, 68 short faults may take place during a single scan time. If the scan time is less than 10 ms, these faults will not practically impact the controlled process. The testing of output switches 58, 68 will become clear as the description proceeds.

Some faults within the primary logic circuit 74 or within secondary logic circuit 106 impact the system output in a manner similar to the voter network faults described above. Since each output circuit 74 or 106 transfers output data of the central processor module 16 independently from the other, any fault within one output circuit 74 or 106 cannot propagate to the neighboring circuit. If, for example, the primary logic circuit 74A fails holding a faulty logical "1" on any output 140, the respective electronic valve 58A fails short, but it will not affect the data (DC0 . . . DC7) transferred via the secondary logic circuit 106A. In that event, the secondary logic circuit 106A controls the output 180A over its electronic valve 68A. In the event that the primary logic circuit 74A fails holding a faulty logical "0" on an output 140, the corresponding switch 58A fails open. Hence, output 180A fails OFF. The system output 60, however, will still be controlled over output logic circuits 74 and 106 located in the neighboring output modules 50.

In the event, however, that both primary and secondary logic circuits 74 and 106, in the same output voter network 22 fail concurrently, both switches 58 and 68 in series can be short, hence the respective output 180 as well as the system output fails ON. If, for example, the output of gate 140 and the output of gate 146 both related to the same point fail concurrently holding a logical "1", both corresponding switches 58 and 68 in series fail ON. This would lead to a system failure because the system output 60 will permanently energize and the system will not able to make the shutdown, if required. The corresponding central processor module 16, however, recognizes that those electronic valves 58, 68 are out of control, and disconnects the faulty output voter network 22 from the system output 60 via fault recovery valve 54. The central processor module 16A, for example, commands watchdog controller 30A to activate alarm signal 44A, which disconnects all outputs 180A from the system output 60 via the fault recovery electronic valve 54A. In general, the presence of any two faulty logic circuits 74 and 106 will not cause the system failure.

Concurrent failure in either two interfaces 70, 76 or two control circuits 72, 78 in the same output module 50 can lead to a system failure. Again, as in the case of output logic circuit 74 and 106 faults, the central processor module 16 discovers these faults and disconnects outputs of output voter network 22 from the system output 60 via fault recovery switch 54. Generally, any combination of faults occurring in two elements of the output modules 50 will not cause system failure.

Aside from performing output module 50 diagnostics, each central processor module 16 periodically examines the status of its associated input module 14 using conventional software/hardware means. In the event that one input module 14 fails, its associated central processor module 16 ceases operation with this input module 14 while continuing to operate receiving input data from the neighboring central processor modules 16. If two input modules 14 fail concurrently, the third central processor module 16 transfers input data to the other central processor modules 16 and the system output is still managed by three central processor modules 16. Consequently, the system will still operate in the presence of any two faulty input modules 14. In the event that all input modules fail, the system performs a shutdown.

Another point of possible fault is the communication bus 40. If one bus 40 fails, the associated central processor module 16 recognizes this failure and de-energizes the outputs 180 of the respective output module 50 via the fault recovery switch 54. If two buses 40 fail concurrently, two respective output modules 50 are deactivated, but the system output 60 will still be under the control of the third central processor module 16 that operates over the healthy third bus 40. The system 10 will shut down when every bus 40 fails. Consequently, system 10 still operates in the presence of any two faulty buses 40. A system 10 will shut down only when all buses 40 fail.

The hybrid multiple redundant system 10 may employ a standard dissimilar redundancy technique to provide fault tolerance with respect to generic software and hardware faults. For example, the three central processor modules 16 may provide dissimilar data processing, with respect to each other, by utilizing dissimilar software. The task, however, that each central processor module 16 performs would be similar with respect to each other as mentioned above. Possible generic failure in each central processor module 16 is detected by its associated watchdog controller 30 that disconnects the respective output module 50 from system output 60 via fault recovery switch 54. It will be appreciated that, after the first and second generic failures the system 2-of-3 voting is transformed to 2-of-2 and 1-of-1 voting, respectively. Thus, system 10 remains operational in the presence of generic failures in two central processor modules 16. The system 10 will, however, shut down after a third generic failure. The system's action in response to generic failures in central processor modules 16 or in watchdog controllers 30 is the same as the action described above for hardware and software random faults of central processor modules 16 and watchdog controllers 30.

Each processing unit 12 has its own power supply module (not shown in FIG. 1 and in FIG. 2). In the event that one power supply module (PSM) fails, all switches of the output voter network 22, as well as the fault recovery switch 54, are automatically passed to an OFF condition via conventional technique. Therefore, the system 10 remains operational in the presence of two faulty PSMs, and system 10 shuts down when each PSM fails.

Referring now to FIG. 3, the testing of the output electronic valves 58A and 68A is disclosed. It is seen that the central processor modules 16A and 16C operate with the primary output circuit 18A and the secondary output circuit 20A respectively. The central processor module 16A controls every electronic valve 58A over interface 70A, control circuit 72A, and the primary logic circuit 74A. Similarly, the central processor module 16C controls every electronic valve 68A over interface 76A, control circuit 78A, and the secondary logic circuit 106A. Both central processor modules 16A and 16C participate in output electronic valves 58A and 68A testing that is performed every scan cycle of the system operation.

After control program execution, central processor module 16A and 16C communicate with each other sending READY messages. As soon as each central processor module 16 has read that message, the testing of the output electronic valves 58A and 68A begins. All electronic valves 58A and 68A are tested for stuck-ON and stuck-OFF conditions before sending output data to interfaces 70A and 76A. Central processor modules 16A and 16C concurrently drives electronic valves 58A and 68A from one state to the other and confirms correct functionality of these electronic valves 58A, 68A by reading feedback signals from the current sensors 52A. Conventional current sensors 52A provide status of the output electronic valves 58A and 68A by providing current feedback to the interface 70A over lines 61A. The central processor module 16A activates every current sensor 52A simultaneously via signal 57A and then reads current feedback data from the interface 70A. The testing procedure does not impact the system's operation because it can be performed during a very short time interval (less than 1.0 millisecond). Testing of switches of 58B, 68B and switches 58C, 68C is performed in a similar fashion used for testing switches 58A, 68A. During this testing, each central processor module 16 also tests all other parts including into primary and secondary output circuits 18 and 20, as it will be shown below. After that, each central processor module 16 sends output data to respective primary and secondary output circuits 18 and 20.

Figure 6A:
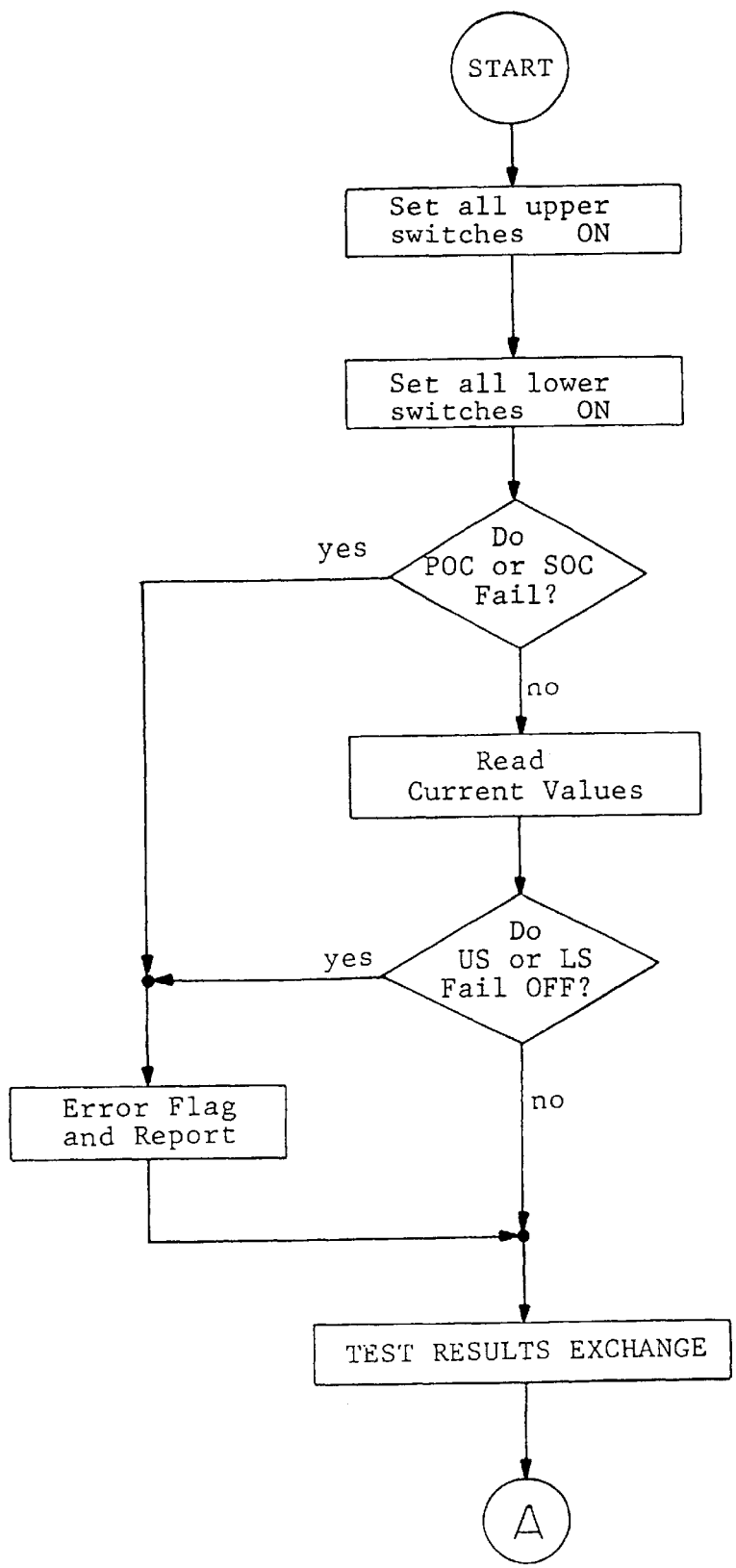
FIGS. 6A–6E are flow charts of an online testing procedure of the output module components according to the present invention.

FIGS. 6a–6e outline a method of on-line testing of the system components. FIG. 6a provides a flow chart for an ON testing procedure, which is in use to determine if both output electronic valves 58 and 68 are able to be ON in every output voter network 22. Each central processor module 16 turns its respective electronic valves 58 and 68 ON. Then, an internal software timer (not shown in FIG. 6a) is set by each of the central processor modules 16 within which the ACK signals 96 and 102 (FIG. 3) must be received from interface 70 and 76 respectively. If the ACK signals 96, 102 are not received in time, the central processor module 16 flags a primary output circuit 18 or secondary output circuit failure. If no errors are found, the central processor module 16 then reads feedback data from all respective current sensors 52 simultaneously. A current value, for each point higher than a predetermined HIGH level indicates that both electronic valves 58 and 68 are ON. Otherwise, when at least one of these electronic valves is OFF, the current value should be below a predetermined LOW level. If every electronic valve 58 and 68 is ON then the test is successful, otherwise the central processor module 16 flags an error. After that, each central processor module 16 sends its diagnostic results to the other central processor modules 16. If one output electronic valve 58 or 68 has failed remaining open, the central processor module 16 reads a status of respective electronic valves of the other output voter networks 22.

Figure 6B:
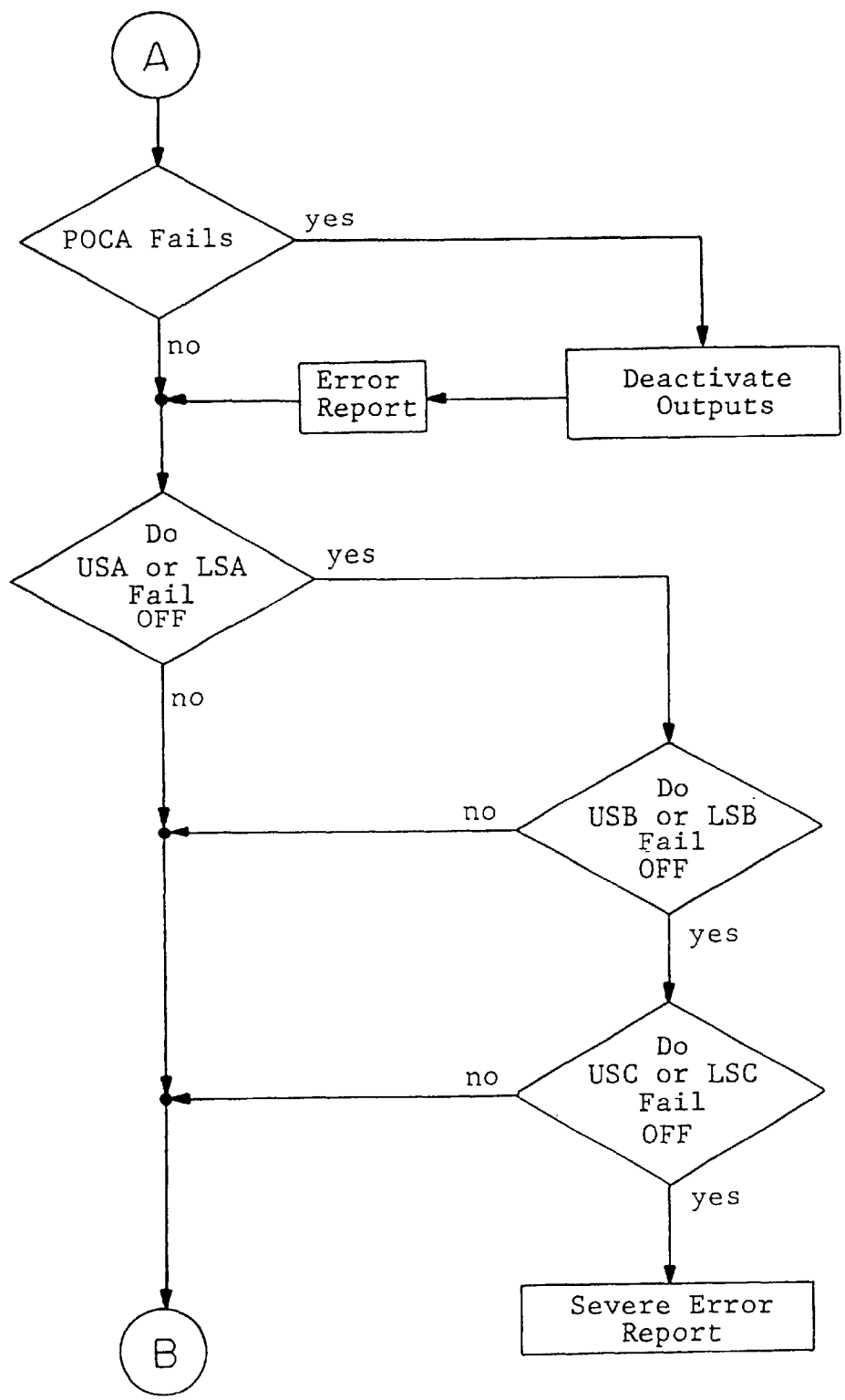

Briefly, the testing procedure outlined in FIG. 6b for the central processor module 16A is as follows. First, a central processor module 16A checks the primary output circuit 18A for failure. If the primary output circuit 18A has failed, the central processor module 16A de-energizes the outputs 180A via the fault recovery electronic valve 54A. After de-energization, or if no failure has occurred, the central processor module 16A reads test results from the other central processor modules 16B and 16C. If both test results indicate that no current is flowing through corresponding electronic valves 58A and 68A, central processor 16A recognizes that the external load is absent. Otherwise, the central processor module 16A begins the testing procedure outlined in FIG. 6c. As can be appreciated, a similar procedure is concurrently performed by the other central processor modules 16B and 16C.

Figure 6C:
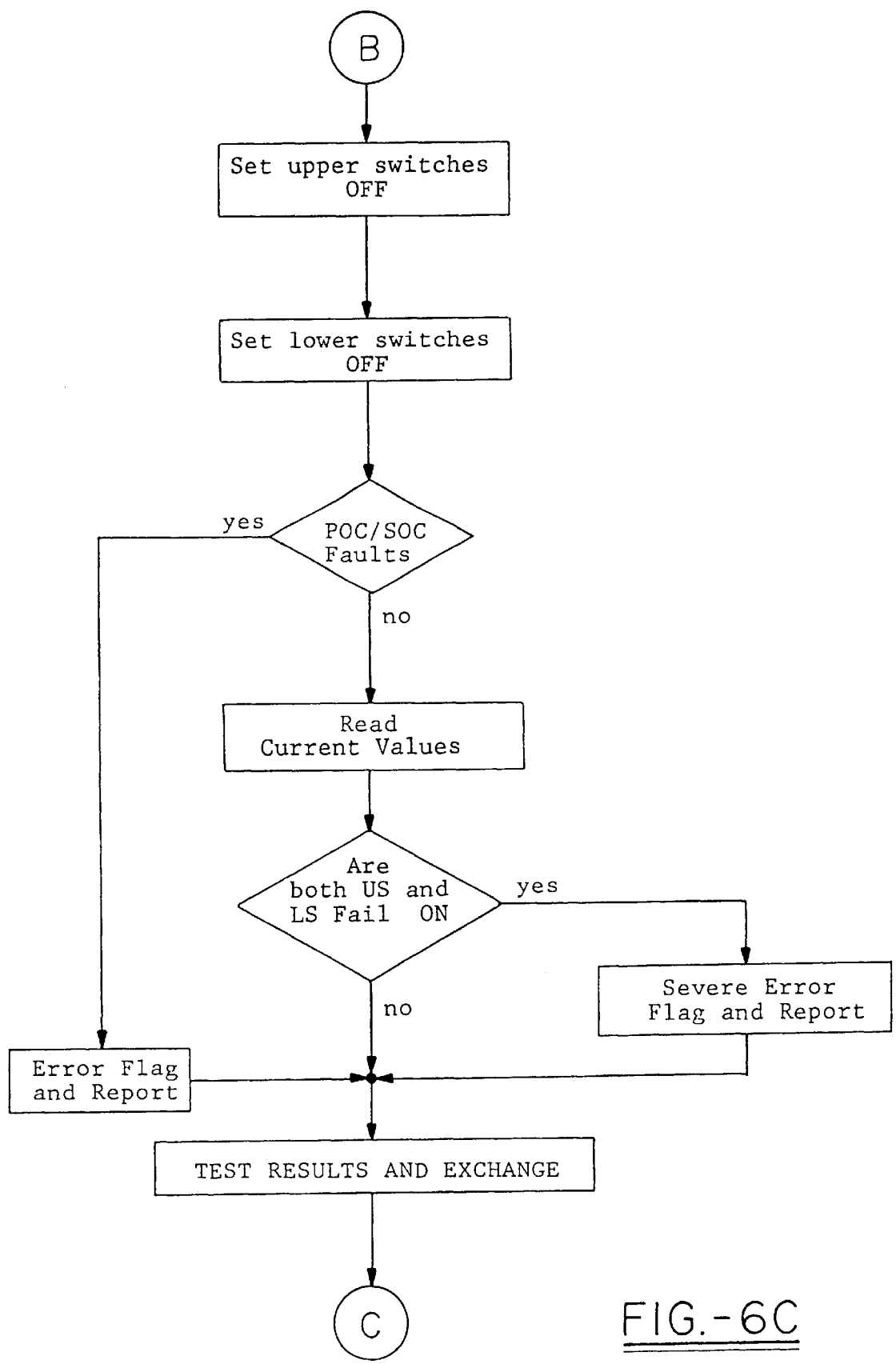
Figure 6D:
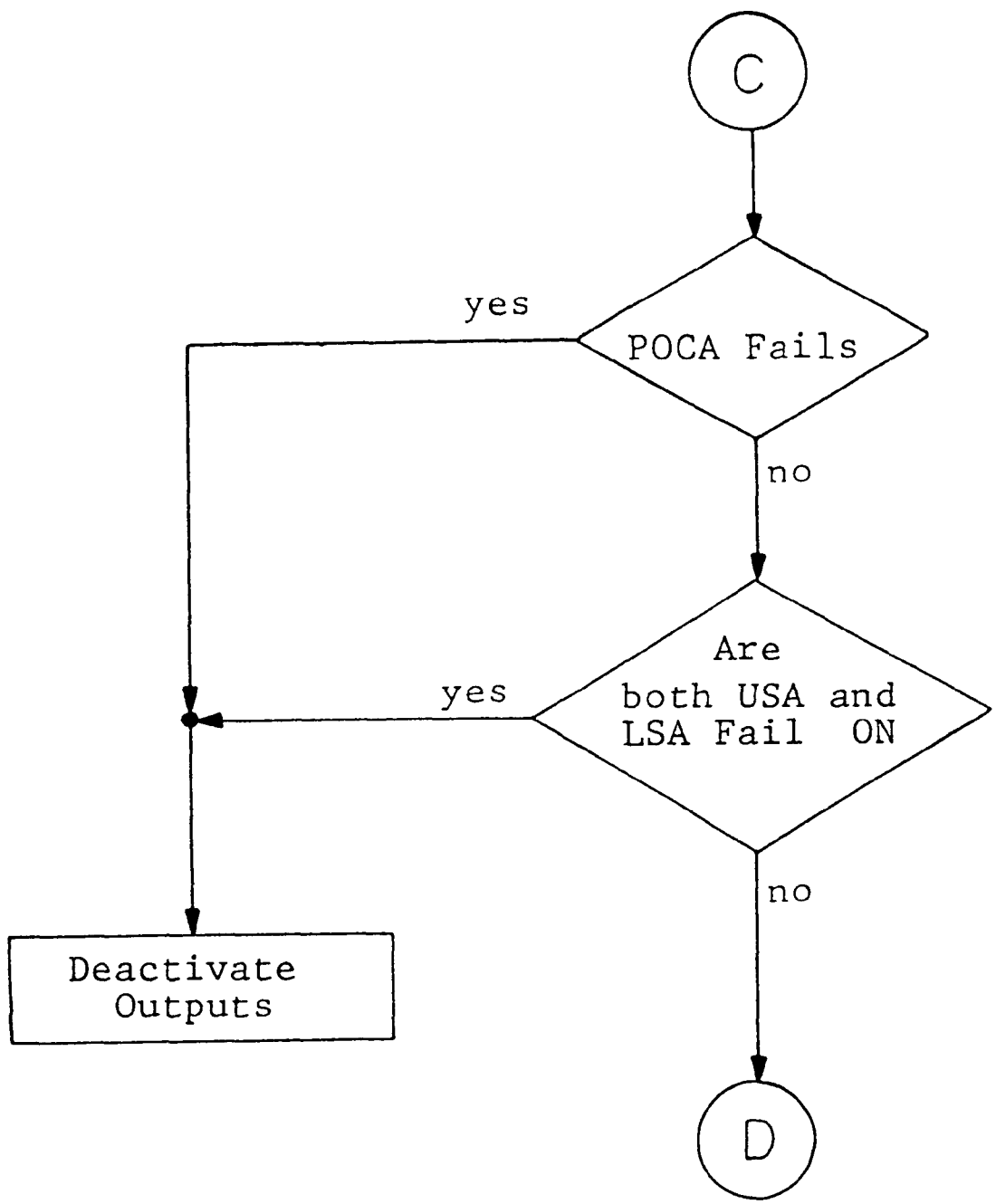

FIG. 6c outlines an OFF testing procedure similar to the above ON testing procedure. Each central processor module 16 commands its respective electronic valves 58 and 68 turn OFF. Possible errors of primary and output circuits 18, 20 are flagged and reported. If the primary output circuit 18 fails, the corresponding central processing module 16 disconnects all outputs 180 from outputs 60 via fault recovery valve 54. The central processor module 16 then reads the feedback data from the current sensor 52 over interfaces 70 and 76. If both electronic valves 58 and 68 in series fail ON, the central processor module 16 sets an OFF-error flag and reports the severe error. Each central processor module 16 then disconnects all faulty outputs 180 from the system output 60 via the fault recovery switch 54. The central processor module 16A, for example, disconnects all outputs 180A of the output voter network 22A from outputs 60 if primary output circuit 18A fails or both electronic valves 58A and 68A fail ON. It is shown in FIG. 6D.

Figure 6E:
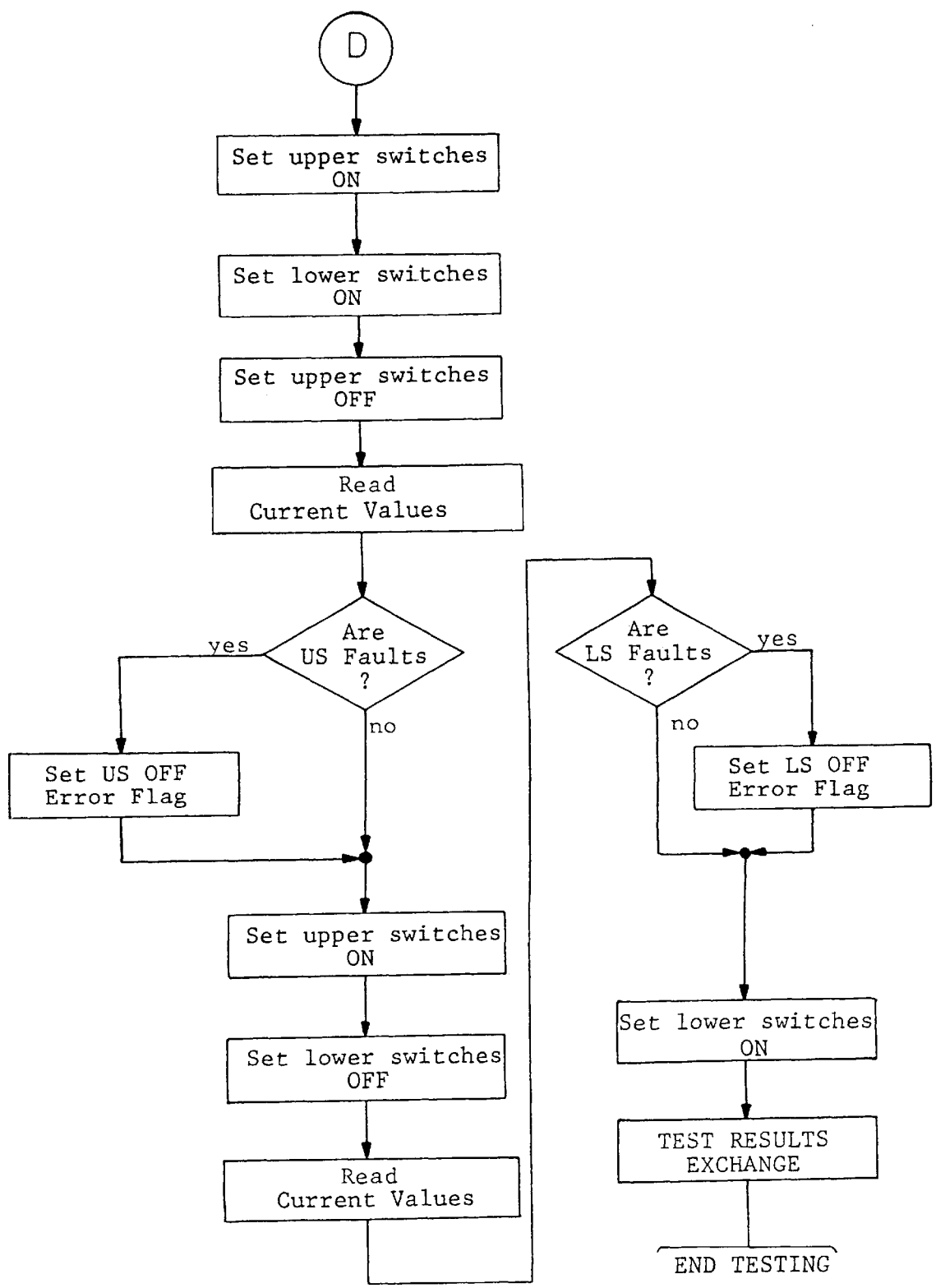

FIG. 6E shows ON-OFF testing procedure that is used to detect if every output electronic valve 58 and 68 is able to pass from ON to OFF. After previous procedure, all electronic valves 58 and 68 are OFF. Each central processor module 16 commands respective electronic valves 58 and 68 turn ON. After that, each central processor module 16 commands each electronic valve 58 OFF, while all electronic valves 68 are still setting ON. The central processor module 16 then reads feedback data from all respective current sensors 52. If electronic valve 58 fails remaining in an ON condition, the central processor module 16 flags an error, but continues testing. All electronic valves 58 are returned to the ON condition, and now, with electronic valves 58 ON, each central processor module 16 commands each electronic valve 68 OFF. The central processor module 16 flags an error if a electronic valve 68 fails remaining in ON condition.

This procedure allows the system to uncover hidden faults that may not have been discovered during ON and OFF testing. A hidden fault occurs when one out of two output electronic valves 58 or 68 in series fails short, while the second electronic valve is still controlled. That fault does not impact system operation, but may decrease system fault tolerance. The error report allows the user to restore the previous level of system fault tolerance by on-line replacement of the faulty part.

Once all testing procedures are successfully completed, each central processor module 16 sends output data to respective primary and secondary output circuit 18 and 20.

Otherwise, the system configuration is modified from 2-of-3 voting into 2-of-2 voting in the presence of one fault and into 1-of-1 voting in the presence of two concurrent faults. Testing procedures considered above may be implemented during time intervals of about 1 ms, if a high-speed current sensor is used. Testing glitch duration where all electronic valves are holding OFF can be less than 200 μs and it is tolerant to most field devices that can be controlled by the system 10.

It will be appreciated from the foregoing that the present invention achieves the objects stated above. While this invention has been described with reference to a single embodiment incorporating three processing units, it should be understood that this invention may be expanded to achieve further fault tolerancy and increase reliability by incorporating additional redundant processing units into the presented system configuration. For example, the system, comprising five processing units will tolerate up to four faults while the conventional 3-of-5 system tolerates only two faults.

Furthermore, it should be understood that voltage feedback may be used in addition to current feedback to detect proper ON condition of output electronic valves 58, 68. As should be readily understood this type of sensing could be performed with conventional voltage current sensors. These and other modifications and improvements may be made without departing from the spirit of the invention. Therefore, to appreciate the scope of the present invention, reference should be made to the following claims.

What is claimed is:

1. A hybrid multiple redundant computer system comprising:

a) a first, a second, and a third processing unit operating in parallel, each of which includes a central processor module connected to an input and an output module for receiving an input data from said input module and for using the input data as input to a control program to provide output data by execution of said control program, each central processor module has a data bus for transferring said output data to output modules in a such manner that the central processor module associated with the first processing unit transmits output data to the associated output module and to the output module associated with the second processing unit, the central processor module associated with the second processing unit transmits output data to the associated output module and to the output module associated with the third processing unit, the central processor module associated with the third processing unit transmits output data to the associated output module and to the output module associated with the first processing unit, said output module having no single point of failure;

b) means in the output module for providing its output as a logical product of output data received from two central processor modules, said output modules connected to each other for generating system output as a logical sum of the outputs produced by said output modules to provide a two-out-of-three vote among output data produced by three central processor modules;

c) the processing unit further comprising a watchdog controller connected to the associated central processor module for detecting the occurrence of a fault within said central processor module and for activating an alarm signal in the event that said central processor module fails;

d) the output module in each processing unit further connected to the associated watchdog controller and connected to watchdog controllers in the other processing units for receiving alarm signal from any of said watchdog controllers in the event that the associated central processor module fails;

e) means in the output module for producing the output of said output module as a logical product of output data received from the associated central processor module and from neighbor central processor module if said alarm signal in each processing unit is not activated, means for disabling said output if alarm signal received from the associated watchdog controller is activated, for generating said output by only using the output data received from the associated central processor module if at least one out of two alarm signals produced by the neighbor watchdog controllers is activated, thereby allowing the system to reconfigure from the triple processing unit configuration with two-out-of-three voting to a two-out-of-two diagnostic dual processing unit configuration in the event that the associated central processor module fails, to a single processing unit configuration in the event that the associated and any neighbor central processor modules concurrently fail, and to the predetermined safe output condition in the event that each central processor module fails;

f) wherein said means in the output module associated with the first processing unit for producing its output as a logic product of output data received by said output module from central processor modules associated with first and third processing units if said alarm signal in each processing unit is not activated, and generates said output by only using the output data received from the central processor module associated with the first processing unit if at least one out of two alarm signals associated with second and third processing units is activated, and for disabling the output of said output module if the alarm signal associated with the first processing unit is activated;

g) wherein said means in the output module associated with the second processing unit for producing its output as a logic product of output data received by said output module from central processor modules associated with second and first processing units if said alarm signal in each processing unit is not activated, and generates said output by only using the output data received from the central processor module associated with the second processing unit if at least one out of two alarm signals associated with first and third processing units is activated, and for disabling the output of said output module if the alarm signal associated with the second processing unit is activated;

h) wherein said means in the output module associated with the third processing unit for producing its output as a logic product of output data received by said output module from central processor modules associated with third and second processing units if said alarm signal in each processing unit is not activated, and generates said output by only using the output data received from the central processor module associated with the third processing unit if at least one out of two alarm signals associated with first and second processing units is activated, and for disabling the output of said output module if the alarm signal associated with the third processing unit is activated;

i) means in each central processor module for reading status of the associated output module to disable output of said output module if a fault of that module is discovered;

j) means in each central processor module for reading status of the associated input module and disabling input data received from said input module if a fault of that module is discovered.

2. The hybrid multiple redundant system of claim 1, wherein:

a) each processing unit module further comprising an additional output for producing an alarm signal on said output when a fault within the associated output module is discovered by said central processor module; and b) each central processor module further comprising an OR-gate having a first input connected to said additional output of the central processor module, a second input connected to the output of the associated watchdog controller, and an output connected to each output module, whereby said OR-gate transmits the alarm signal from either said central processor module or said watchdog controller to each output module to provide reconfiguration from said triple processing unit configuration to said dual processing unit configuration in the event that the associated output module fails.

3. The hybrid multiple redundant system of claim 1 wherein:

a) the data bus associated with the central processor module further connected to each neighbor central processor module for allowing the central processor module to transmit said input data to each neighbor central processor module at the same time;

b) each central processor module has means for reading input data transmitted from two neighbor central processor modules via data bus respectively associated with said neighbor central processor modules, and for implementation two-out-of-three software voting of said input data and using the voted data as input to the control program;

c) each central processor module has means for transmitting its status to both neighbor central processor modules over the associated data bus and means for reading the status of both neighbor central processor module via data bus respectively associated with said neighbor central processor modules;

d) each central processor module has means for transmitting the status of the associated input and output module to both neighbor central processor modules over the associated data bus and means for reading said status from both neighbor central processor module via data bus respectively associated with said neighbor central processor modules;

e) each central processor module has means for synchronizing its operation with the operation of neighbor central processor modules and for providing scan-based mode of said hybrid multiple redundant system operation to perform control program execution on a cyclical basis.

4. The hybrid multiple redundant system of claim 3, wherein:

a) the output module in each processing unit comprising a primary output circuit and a secondary output circuit connected to the associated central processor module and to other central processor module respectively for receiving output data from said central processor modules;

b) the output module in each processing unit further comprising an output voter network connected to outputs of associated primary and secondary output circuits for producing a logic product of said outputs on the output of said output module, thereby producing said output as a logical product of the output data received by said primary and secondary output circuits from the corresponding central processor modules;

c) wherein the output of said output voter network connected with corresponding outputs of two other output voter networks for producing system output as a result of two-out-of-three voting among output data of said three central processor modules;

d) said primary and secondary output circuits in the output module associated with the first processing unit are connected over the associated data buses to the central processor modules associated with first and third processing unit respectively for receiving output data from said central processor modules, e) said primary and secondary output circuits in the output module associated with the second processing unit are connected over the associated data buses to the central processor modules associated with second and first processing unit respectively for receiving output data from said central processor modules;

f) said primary and secondary output circuits in the output module associated with the third processing unit are connected over the associated data buses to the central processor modules associated with third and second processing unit respectively for receiving output data from said central processor modules;

g) the primary output circuit in each processing unit is further connected to the associated watchdog controller for receiving said alarm signal from said watchdog controller;

h) the secondary output circuit in the output module associated with the first processing unit is further connected to the watchdog controllers associated with the second and the third processing units respectively for receiving said alarm signal from each of said watchdog controllers;

i) the secondary output circuit in the output module associated with the second processing unit is further connected to the watchdog controllers associated with the first and the third processing units respectively for receiving said alarm signal from each of said watchdog controllers;

j) the secondary output circuit in the output module associated with the third processing unit is further connected to the watchdog controllers associated with the second and the first processing units respectively for receiving said alarm signal from each of said watchdog controllers;

k) the primary output circuit in each output module further connected to the associated secondary output circuit for transferring output data of the associated central processor module to said secondary output circuit if at least one of said alarm signals received by the associated secondary output circuit is activated;

l) the primary output circuit has means for transferring output data of the associated central processor module to the associated output voter network if said alarm signal is not activated and disabling outputs of said output voter network if said alarm signal is activated;

m) the secondary output circuit associated with the first processing unit has means for transferring output data of the central processor module associated with the third processing unit to the associated output voter network if both alarm signals produced by the watchdog controllers associated with second and third processing units are not activated, for producing an output as a logic sum of output data received from central processor modules associated with first and third processing units and transferring said output to the associated output voter network if an alarm signal produced by the watchdog controller associated with the second processing unit is activated, and for transferring output data of the central processor module associated with the first processing unit to the associated output voter network if an alarm signal produced by the watchdog controller associated with the third processing unit is activated;

n) the secondary output circuit associated with the second processing unit has means for transferring output data of the central processor module associated with the first processing unit to the associated output voter network if both alarm signals produced by the watchdog controllers associated with first and third processing units are not activated, for producing an output as a logic sum of output data received from central processor modules associated with first and second processing units and for transferring said output to the associated output voter network if an alarm signal produced by the watchdog controller associated with the third processing unit is activated, and transferring output data of the central processor module associated with the second processing unit to the associated output voter network if an alarm signal produced by the watchdog controller associated with the first processing unit is activated;

o) the secondary output circuit associated with the third processing unit has means for transferring output data of the central processor module associated with the second processing unit to the associated output voter network if both alarm signals produced by the watchdog controllers associated with first and second processing units are not activated, for producing an output as a logic sum of output data received from central processor modules associated with second and third processing units and for transferring said output to the associated output voter network if an alarm signal produced by the watchdog controller associated with the first processing unit is activated, and for transferring output data of the central processor module associated with the third processing unit to that output voter network if an alarm signal produced by the watchdog controller associated with the second processing unit is activated.

5. The hybrid multiple redundant system of claim 4, wherein:

a) each central processor module has means for periodically producing the output data, each bit of which corresponding to the system input;

b) each output voter network comprising multiple pairs of first and second electronic valves, within in each pair connected in series and each of said pairs connected by one side to an external power supply, and each of said pairs separately connected by other side to output of the associated output module for providing said single-bit output that is energized if both first and second electronic valves ON and de-energized if at least one of said electronic valves OFF;

c) said primary and secondary output circuit in each output module connected to said first and second electronic valves respectively for setting said first and second electronic valve in any pair of said valves in a state according to the output of said primary and secondary output circuit respectively;

d) each primary output circuit has means for transferring each output of the associated central processor module to the associated first electronic valve if alarm signal received from the associated watchdog controller is not activated and setting each first electronic valve OFF if said alarm signal activated, thereby de-energize all outputs of the associated output module in the event that associated central processor module fails and its fault is recognized by the associated watchdog controller;

e) the secondary output circuit associated with the first processing unit has means for transferring each output of the central processor module associated with the third processing unit to the associated second electronic valve if both alarm signals received by said secondary output circuit from the watchdog controllers associated with second and third processing unit are not activated, means for producing a logic sum of the corresponding bits of the output data received from central processor modules associated with first and third processing units and transferring said logic sum to the second electronic valve if an alarm signal produced by the watchdog controller associated with the second processing unit is activated, and means for transferring output data of the central processor module associated with the first processing unit to the second electronic valve if an alarm signal produced by the watchdog controller associated with the third processing unit is activated;

f) the secondary output circuit associated with the second processing unit has means for transferring each output of the central processor module associated with the first processing unit to the associated second electronic valve if both alarm signals received by said secondary output circuit from the watchdog controllers associated with first and third processing unit are not activated, means for producing a logic sum of the corresponding bits of the output data received from central processor modules associated with first and second processing units and transferring said logic sum to the second electronic valve if an alarm signal produced by the watchdog controller associated with the third processing unit is activated, and means for transferring output data of the central processor module associated with the second processing unit to the second electronic valve if an alarm signal produced by the watchdog controller associated with the first processing unit is activated;

g) the secondary output circuit associated with the third processing unit has means for transferring each output of the central processor module associated with the second processing unit to the associated second electronic valve if both alarm signals received by said secondary output circuit from the watchdog controllers associated with first and second processing unit are not activated, means for producing a logic sum of the corresponding bits of the output data received from central processor modules associated with second and third processing units and transferring said logic sum to the second electronic valve if an alarm signal produced by the watchdog controller associated with the first processing unit is activated, and means for transferring output data of the central processor module associated with the third processing unit to the second electronic valve if an alarm signal produced by the watchdog controller associated with the second processing unit is activated.

6. The hybrid multiple redundant system of claim 5, wherein:

a) the output module further includes a fault recovery valve connected by one side to an external power supply and connected by other side to one side of each pair of said first and second electronic valves, other side of each said pair is separately connected to the output of said output module;

b) in each processing unit the watchdog controller further connected to the fault recovery valve for sending said alarm signal to said fault recovery valve OFF for de-energizing all outputs of the associated output module from the system output in the event that the associated central processor module fails;

c) each output voter network further comprising a current sensor in each pair of first and second electronic valves, said current sensor connected in series with said first and second electronic valves and connected to the associated primary output circuit for producing a logic feedback data transmitted to the associated central processor module over the associated primary output circuit to inform said associated central processor module about a value of current flowing through said first and second electronic valves;

d) means in each primary output circuit for reading said feedback data from each of said current sensors simultaneously and for transferring said feedback data to the associated central processor module;

e) means in each central processor module for receiving said feedback data from the associated primary output circuit, comparing said feedback data with recent output data and sending a command to the associated watchdog controller for activating said alarm signal to de-energize each output of the associated output module from system output by setting the associated fault recovery valve OFF if a fault in any pair of said first and second electronic valves is discovered;

f) means in each primary output circuit for producing an acknowledge signal and for transferring said acknowledge signal to the associated central processor module;

g) means in each central processor module for reading said acknowledge signal from the associated primary output circuit for evaluating condition of said primary output circuit and sending a command to the associated watchdog controller for activating said alarm signal to de-energize each output of the associated output module from system output by setting the associated fault recovery valve OFF if a fault in said primary output circuit is discovered.

7. The fault tolerant system of claim 6, wherein:

a) each primary output circuit comprising a parallel programmable interface communicated with the associated central processor module over the associated data bus, a primary control circuit connected to said programmable interface for receiving and storing output data of the associated central processor module via said parallel programmable interface, said primary output circuit further includes a primary logic circuit connected to outputs of said control circuit to receive output data of said central processor module, outputs of said primary logic circuit connected to the associated first electronic valves;

b) each secondary output circuit comprising a parallel programmable interface communicated with the certain central processor module, a secondary control circuit connected with said programmable interface for receiving and storing output data of said central processor module via said parallel programmable interface and providing asynchronous data communications between said central processor module and said parallel programmable interface, said secondary output circuit further includes a secondary logic circuit connected with outputs of said control circuit to receive output data of said central processor module, outputs of said secondary logic circuit connected to the associated second electronic valves;

c) the primary logic circuit in each primary output circuit further connected to the associated watchdog controller for receiving the alarm signal from said watchdog controller;

d) the secondary logic circuit in the secondary output circuit associated with the first processing unit further connected to watchdog controllers associated with second and third processing units respectively for receiving said alarm signal each of said watchdog controllers;

e) the secondary logic circuit in the secondary output circuit associated with the second processing unit further connected to watchdog controllers associated with first and third processing units respectively for receiving said alarm signal from each of said watchdog controllers;

f) the secondary logic circuit in the secondary output circuit associated with the third processing unit further connected to watchdog controllers associated with first and second processing units respectively for receiving said alarm signal from each of said watchdog controllers;

g) the primary output circuit in each output module further connected to the associated secondary output circuit for transferring output data of the associated central processor module to said secondary output circuit if at least one of said alarm signal received by the associated secondary logic circuit is activated;

h) the primary logic circuit in each primary output circuit has means for transferring output data of the associated central processor module to the associated first electronic valves if alarm signal produced by the associated watchdog controller is not activated and setting each first electronic valve OFF if said alarm signal is activated, thereby de-energizing all outputs of the associated output module from the system outputs in the event that associated central processor module fails and its fault is recognized by the associated watchdog controller;

i) the secondary logic circuit in the secondary output circuit associated with the first processing unit has means for transferring output data of the central processor module associated with the third processing unit to the associated second electronic valves if both alarm signals received by said secondary logic circuit from the watchdog controllers associated with second and third processing units are not activated, for producing a logic sum of the corresponding bits of the output data received from central processor modules associated with first and third processing units and transferring said logic sum to the second electronic valve if an alarm signal produced by the watchdog controller associated with the second processing unit is activated, and for transferring output data of the central processor module associated with the first processing unit to the second electronic valve if an alarm signal produced by the watchdog controller associated with the third processing unit is activated;

j) the secondary logic circuit associated with the second processing unit has means for transferring each output of the central processor module associated with the first processing unit to the associated second electronic valve if both alarm signals received by said secondary output circuit from the watchdog controllers associated with first and third processing unit are not activated, for producing a logic sum of the corresponding bits of the output data received from central processor modules associated with first and second processing units and transferring said logic sum to the second electronic valve if an alarm signal produced by the watchdog controller associated with the third processing unit is activated, and for transferring output data of the central processor module associated with the second processing unit to the second electronic valve if an alarm signal produced by the watchdog controller associated with the first processing unit is activated;

k) the secondary logic circuit associated with the third processing unit has means for transferring each output of the central processor module associated with the second processing unit to the associated second electronic valve if both alarm signals received by said secondary output circuit from the watchdog controllers associated with first and second processing unit are not activated, for producing a logic sum of the corresponding bits of the output data received from central processor modules associated with second and third processing units and transferring said logic sum to the second electronic valve if an alarm signal produced by the watchdog controller associated with the first processing unit is activated, and for transferring output data of the central processor module associated with the third processing unit to the second electronic valve if an alarm signal produced by the watchdog controller associated with the second processing unit is activated.

8. The fault tolerant system of claim 7, wherein:

a) each primary logic circuit comprising an inverter for receiving and inverting the alarm signal from the associated watchdog controller and further comprising a plurality of AND gates and a pluralities of drivers, the output of each AND gate connected to the corresponding driver, the driver in turn connected to the corresponding first electronic valve, a first input of all said AND gates connected together to the output of said inverter, while another input of each AND gate separately connected to the corresponding output of the primary control circuit for receiving output of said control circuit and transfer said output to the corresponding first electronic valve when said alarm signal is false and setting said first electronic valve OFF when said alarm signal is true;

b) the secondary logic circuit in the output module associated with the first processing unit comprising an OR-gate connected to the watchdog controllers associated with second and third processing unit for receiving alarm signal from each of said watchdog controllers and further comprising an inverter for receiving and inverting alarm signal from the watchdog controller associated with the third processing unit and further comprising a plurality of first AND-gates and a plurality of second AND-gates, first inputs of all first AND-gates connected together to output of said OR-gate and second output of each first AND-gate connected separately to the corresponding output of the AND-gate in the primary logic circuit associated with the same output module for transferring each output of the associated primary control circuit to the corresponding input of said first AND-gate when at least one alarm signal received by said OR-gate is true, first inputs of all second AND-gates connected together to output of said inverter and the second output of each second AND-gate connected separately to the corresponding output of the secondary control circuit for receiving said output if said inverted alarm signal is true;

c) said secondary logic circuit in the output module associated with the first processing unit further comprising a plurality of OR-gates and a plurality of drivers, an output of each OR-gate in said plurality of OR-gates connected to the corresponding driver, that in turn connected to the corresponding second electronic valve, first input of each said OR-gate separately connected to output of said first AND-gate and second input of each said OR-gate separately connected to output of said second AND-gate for transferring corresponding output of the associated secondary control circuit to the corresponding second electronic valve if both alarm signals received by said secondary logic circuit from the watchdog controllers associated with second and third processing units are false, for producing an output as a logic sum of the corresponding bits of the output data received from the associated primary and secondary control circuits and for transferring said output to the second electronic valve if an alarm signal received from the watchdog controller associated with the second processing unit is true, while an alarm signal received from the watchdog controller associated with the third processing unit is false, and for transferring each output of the associated primary control circuit to the corresponding second electronic valve if the alarm signal received from the watchdog controllers associated with the third processing unit is true;

d) the secondary logic circuit in the output module associated with the second processing unit comprising the same components as said secondary logic circuit in the output module associated with the first processing unit, wherein said OR-gate connected to the watchdog controllers associated with first and third processing units for receiving alarm signal from each of said watchdog controllers and said inverter is used for receiving and inverting alarm signal from the watchdog controller associated with the first processing unit, each AND-gate is used for transferring corresponding output of the associated secondary control circuit to the corresponding second electronic valve if both alarm signals received by said secondary logic circuit from the watchdog controllers associated with first and third processing units are false, for producing an output as a logic sum of the corresponding bits of the output data received from the associated primary and secondary control circuits and for transferring said output to the corresponding second electronic valve if an alarm signal received from the watchdog controller associated with the third processing unit is true, while an alarm signal received from the watchdog controller associated with the first processing unit is false, and for transferring each output of the associated primary control circuit to said second electronic valve if the alarm signal received from the watchdog controllers associated with the first processing unit is true;

e) the secondary logic circuit in the output module associated with the third processing unit comprising the same components as said secondary logic circuit in the output module associated with the first processing unit, wherein said OR-gate connected to the watchdog controllers associated with first and second processing units respectively for receiving alarm signal from each of said watchdog controllers and said inverter is used for receiving and inverting alarm signal from the watchdog controller associated with the second processing unit, each second AND-gate is used for transferring corresponding output of the associated secondary control circuit to the corresponding second electronic valve if both alarm signals received by said secondary logic circuit from the watchdog controllers associated with first and second processing units are false, for producing an output as a logic sum of the corresponding bits of the output data received from the associated primary and secondary control circuits and for transferring said output to the corresponding second electronic valve if an alarm signal received from the watchdog controller associated with the first processing unit is true, while an alarm signal received from the watchdog controller associated with the second processing unit is false, and for transferring each output of the associated primary control circuit to said second electronic valve if the alarm signal received from the watchdog controller associated with the second processing unit is true.

9. The hybrid multiple redundant system of claim 8, wherein:

a) each parallel programmable interface comprises in one chip a data buffer and control register, said data buffer connected to the associated data bus for receiving said output data from the associated central processor module over said data lines and for transmitting said feedback data to the associated central processor module over said data lines, said control register connected to the associated data bus for receiving address signals and write/read signals from the associated central processor module over said address and control lines respectively;

b) said parallel programmable interface further comprising an A-port a B-port, and a C-port, said A-port has an output buffer for storing output data received from the associated central processor module, said B-port has a multiple inputs for receiving feedback data from the associated current sensors and for transferring said feedback data to the associated central processor module over the associated data lines, said C-port has an output for producing a logic "0" output buffer full signal when said A-port received output data from the associated central processor module;

c) said C-port in each parallel programmable interface associated with the primary output circuit further has first input for receiving a logic "0" acknowledge signal producing by the primary control circuit and second input for receiving a logic "0" acknowledge signal from the second control circuit;

d) said C-port in each parallel programmable interface associated with the secondary output circuit further has first input for receiving a logic "0" acknowledge signal producing by the secondary control circuit and second input for receiving a logic "0" acknowledge signal from the primary control circuit, e) each primary control circuit and each secondary control circuit comprising a plurality of flip-flops, an inverter and a clock, input of each flip-flop connected to the corresponding output of said A-port for receiving output data from the corresponding central processor module, said control circuit further comprising first and second flip-flop, outputs of said flip-flops initialized for a logic "1" level, output of said clock connected to a clock input of the first flip-flop and connected to a clock input of the second flip-flop over said inverter, data input of the first flip-flop connected to the output of said C-port for receiving said output buffer full signal, for producing then a logic "0" output signal on the nearest positive edge on a clock impulse received by the first flip-flop from the clock, output of the first flip-flop connected to clock input of each flip-flop in said plurality of flip-flops for writing each single-bit output of the A-port to the corresponding flip-flop in said plurality of flip-flops on the negative edge of said logic "0" output signal, output of the first flip-flop further connected to an input of the second flip-flop, said second flip-flop generates its output as a logic "0" acknowledge signal on the nearest positive edge of the inverted clock impulse;

f) output of said second flip-flop in the primary control circuit connected to the first input of said C-port in the associated parallel programmable interface and further connected with the second output of said C-port in the parallel programmable interface associated with the secondary output circuit in the same output module for transferring said logic "0" acknowledge signal to both said parallel programmable interfaces at the same time to inform the corresponding central processor modules that each of them can transfer the next output data to the corresponding parallel programmable interface, outputs of flip-flops in said plurality of flip-flops connected to AND-gates in the associated primary logic circuit for transferring said output data of the associated central processor module to said primary logic circuit;

g) output of said second flip-flop in the secondary control circuit connected to the first input of said C-port in the associated parallel programmable interface and further connected with the second output of said C-port in the parallel programmable interface associated with the primary output circuit in the same output module for transferring said logic "0" acknowledge signal to both said parallel programmable interfaces at the same time to inform the corresponding central processor modules that each of them can transfer the next output data to the corresponding parallel programmable interface, outputs of flip-flops in said plurality of flip-flops connected to AND-gates in the associated secondary logic circuit for transferring said output data of the corresponding central processor module to said secondary logic circuit;

h) the central processor module has means for reading said acknowledge signal from each corresponding parallel programmable interface via the associated data bus for getting information if both corresponding control circuits received output data from corresponding central processor modules.

10. A method for detecting and recovering faults in the output module in the hybrid multiple redundant system of claim 9, comprising in every scan cycle of said system operation the steps of:

a) checking in each output module the ability of all electronic valve to switch ON at the same time as a response to the corresponding command received from the corresponding central processor modules;

b) checking in each output module the ability of all electronic valve to switch OFF at the same time as a response to the corresponding command received from the corresponding central processor modules;

c) checking in each output module the ability of each electronic valve in each pair of said electronic valves separately to switch from ON to OFF according to the corresponding command received from the corresponding central processor module for detecting hidden faults not detected by checking the ability of all electronic valve switching to ON and switching to OFF;

d) if no faults are detected in steps a), b), and c), transferring output data of the central processor module to the associated parallel programmable interface.

11. A method as defined in claim 10, wherein:

a) the step of checking the ability of all electronic valve switching to ON at the same time includes communication among central processor modules to transfer a command by each central processor module to its associated parallel programmable interfaces for applying control signal to each electronic valve which would force said electronic valve ON, for reading said feedback data by each central processor module from all associated current sensors via the parallel programmable interface associated with the primary output circuit and measuring the actual current which passes through each pair of electronic valves for checking if the value of said current is an error condition if the value of said current in any of said pair of electronic valves does not match the expected HIGH level;

b) the step of checking the ability of all electronic valve to switch ON at the same time, further includes communication among said central processor for sending by each central processor module the results of said checking to both neighbor central processor modules for comparing the checking results related to the same output in each first output module and generating a message to indicate an error condition of the external device connected to said output if the current in any of said pair of electronic valves related to the same output module does not match the expected HIGH level;

c) the step of checking the ability of all electronic valves to switch OFF at the same time includes communication among said central processor modules to transfer a command by each central processor module to its associated parallel programmable interfaces for applying control signal to each electronic valve which would force said electronic valve OFF, reading said feedback data by each central processor module from all associated current sensors via the parallel programmable interface associated with the primary output circuit for measuring the actual current which passes through each pair of two serial connected electronic valves for checking if the value of said current is below than a predetermined LOW level, writing a command by the central processor module to the associated watchdog controller for activating its alarm signal for setting associated fault recovery valve OFF to de-energize all outputs of the associated output module from system output and generating a message to indicate an error condition if the value of said current in any of said pair of electronic valves does not match the expected LOW level;

d) checking in each output module the ability of each electronic valve in each pair of said electronic valves separately to switch from ON to OFF includes communication among said central processor modules for transferring a command by each central processor module to the parallel programmable interface associated with the primary output circuit to apply a control signal to each first electronic valve which would force said electronic valve OFF and for transferring a command from the central processor module to the parallel programmable interface associated with the secondary output circuit to apply control signal to each second electronic valve which would force said electronic valve ON, reading said feedback data by the central processor module from all associated with the primary output circuit for measuring the actual current which passes through each pair of said electronic valves for checking if the valve of said current is below than a predetermined LOW level and generating a message to indicate an error condition if the value of said current in any of said pair of electronic valves does not match the expected LOW level, the next step of communication among central processor modules is used for writing a command by each central processor module to the parallel programmable interface associated with the primary output circuit to apply control signal to each first electronic valve which would force said electronic valve ON and for writing a command by each central processor module to the parallel programmable interface associated with the secondary output circuit to apply control signal to each second electronic valve which would force said electronic valve OFF, reading said feedback data by the central processor module from all associated current sensors via the associated primary output circuit for measuring the actual current which passes through each pair of two serial connected electronic vales for checking if the value of said current is below than a predetermined LOW level and generating a message to indicate an error condition if the value of said current in any of said pair of electronic valves does not match the expected LOW level.

12. The method as defined in claim 10 or 11, wherein:
a) the step of checking the ability of said electronic valves to switch ON at the same time and the step of checking the ability of said electronic valves to switch OFF at the same time further includes means in each central processor module for reading said acknowledge signal producing by the parallel programmable interface associated with the primary output circuit and reading said acknowledge signal produced by the parallel programmable interface associated with the secondary output circuit, said central processor module generating a message to indicate an error condition of any acknowledge signal does not appear within the predetermined time interval and writing a command to the associated watchdog controller for activating an alarm signal for setting associated fault recovery valve OFF disconnecting all outputs of the output module from system output if the parallel programmable interface associated with the primary output circuit does not produce said acknowledge signal within the predetermined time interval.

13. The hybrid multiple redundant system of claim 9 wherein:
a) said first, second, and third processing units provide dissimilar data processing with respect to each other by utilizing dissimilar hardware in each input module, dissimilar hardware in each central processor module, and dissimilar hardware in each output module for decreasing influence of possible generic hardware faults to the ability of said system operating properly; and
b) said central processor modules provide dissimilar data processing with respect to each other by utilizing dissimilar software in each central processor module for decreasing influence of possible generic software faults to the ability of said system operating properly.

* * * * *